INVENTORS
GORDON A. VALENTINE
JOHN C. RIVEDAL
BY
Strauch, Nolan, Neale,
Nies & Bronaugh
ATTORNEYS INVENTORS
GORDON A. VALENTINE
JOHN C. RIVEDAL
BY
Strauch, Nolan, Neale, Nies & Bronaugh
ATTORNEYS INVENTOR.
GORDON A. VALENTINE
JOHN C. RIVEDAL
BY
Strauch, Nolan, Neale, Nies & Bronaugh
ATTORNEYS INVENTORS
GORDON A. VALENTINE
JOHN C. RIVEDAL
BY Strauch, Nolan, Neale, Nies & Bronaugh
ATTORNEYS INVENTORS
GORDON A. VALENTINE
JOHN C. RIVEDAL
BY
Strauch, Nolan, Neale, Nies & Bronaugh
ATTORNEYS INVENTOR.
GORDON A. VALENTINE
JOHN C. RIVEDAL
BY
Strauch, Nolan, Neale,
Nies & Bronaugh
ATTORNEYS INVENTORS
GORDON A. VALENTINE
JOHN C. RIVEDAL
BY
Strauch, Nolan, Neale,
Nies & Bronaugh
ATTORNEYS

CATAPULT-ASSISTED TRACTOR ROCKET ESCAPE SYSTEM

INVENTOR.
GORDON A. VALENTINE
JOHN C. RIVEDAL
BY
Strauch, Nolan, Neale, Nies & Bronaugh
ATTORNEYS INVENTORS
GORDON A. VALENTINE
JOHN C. RIVEDAL
BY
Strauch, Nolan, Neale, Nies & Bronaugh
ATTORNEYS INVENTORS
GORDON A. VALENTINE
JOHN C. RIVEDAL
BY
Strauch, Nolan, Neale,
Nies & Bronaugh
ATTORNEYS INVENTORS
GORDON A. VALENTINE
JOHN C. RIVEDAL
BY
Strauch, Nolan, Neale, Nies & Bronaugh
ATTORNEYS INVENTORS
GORDON A. VALENTINE
JOHN C. RIVEDAL
BY
Strauch, Nolan, Neale,
Nies & Bronaugh
ATTORNEYS INVENTORS
GORDON A. VALENTINE
JOHN C. RIVEDAL
BY
Strauch, Nolan, Neale, Nies & Bronaugh
ATTORNEYS INVENTORS
GORDON A. VALENTINE
JOHN C. RIVEDAL
BY
Strauch, Nolan, Neale,
Nies & Bronaugh
ATTORNEYS INVENTOR.
GORDON A. VALENTINE
JOHN C. RIVEDAL
BY
Strauch, Nolan, Neale, Nies & Bronaugh
ATTORNEYS INVENTOR.
GORDON A. VALENTINE
JOHN C. RIVEDAL
BY
Strauch, Nolan, Neale, Nies & Bronaugh
ATTORNEYS INVENTOR.
GORDON A. VALENTINE
JOHN C. RIVEDAL
BY
Strauch, Nolan, Neale, Nies & Bronaugh
ATTORNEYS 3,442,473
CATAPULT-ASSISTED TRACTOR ROCKET ESCAPE SYSTEM John C. Rivedal, Aurora, and Gordon A. Valentine, Denver, Colo., assignors to Stanley Aviation Corporation, Denver, Colo., a corporation of New York Filed Oct. 23, 1965, Ser. No. 502,890
Int. Cl. B64d 25/10; F41f 3/06; F02k 9/04
U.S. Cl. 244—122 28 Claims

ABSTRACT OF THE DISCLOSURE

A catapult-assisted extraction apparatus for removing a seated occupant from a vehicle and comprising a catapult connected to the occupant's seat in the vehicle and an extraction rocket secured by a tow line to the occupant or to the seat. The catapult is actuated to drive the occupant's seat to a point of seperation from the vehicle, and the tractor rocket is launched from a stored position in the vehicle at a time so correlated with the catapulted movement of the seat that it is at the end of its tether and firing when the catapult has completed its stroke to thereby pull the catapulted seat or the occupant away from the vehicle.

The present invention relates to escape apparatus for removing an occupant or other load from a vehicle such as an aircraft and is particularly concerned with a novel catapult-assisted, rocket escape system for effecting the rapid separation of an occupant or other load from the vehicle both at low and high vehicle speeds.

One of the major problems associated with conventional catapult systems for ejecting open or encapsulated seats or compartments from an aircraft or like vehicle is that at low speeds ranging from zero to 100 knots the seat or compartment structure is very difficult to stabilize. To overcome this shortcoming, aerodynamic stabilization devices, such as parachutes, have been proposed, but are required to be so large to effect adequate stabilization at low speeds that they produce excessive drag forces at higher speeds.

As a result, two different escape modes usually have been required prior to this invention to make an escape system effectively workable in a range extending from zero speed to the maximum speed of the aircraft. For example, a stabilization parachute that is used fully opened at low speeds may have to be reefed when it is desired to make an escape at higher speeds. Such systems employing different escape modes for high and low vehicle speeds require controls to sense the aircraft speed or dynamic pressure for switching to the proper mode, depending upon the aircraft speed at the time of ejection. It will be appreciated, therefore, that dual-mode escape systems are more complicted and usually less reliable in operation in comparison with single mode escape systems.

Accordingly, one of the major objects of this invention is to provide for a single mode escape system for effectuating rapid, safe, and reliable escape at any of the vehicle speeds.

According to the present invention, a man-carrying seat or compartment is catapulted to a point of separation from the vehicle. At or near the end of the catapult stroke, a tractor rocket is launched and ignited to pull the catapulted man or the man-carrying seat or compartment away from the parent vehicle. The catapult provides a quick separation from the vehicle, while the rocket is effective to provide an inherently stable trajectory over the total speed range of the vehicle. This novel escape apparatus thus advantageously provides for a lower minimum safe ejection speed without degrading the high speed capabilities as experienced with conventional systems. As a result, the present invention eliminates the need for relatively more complex dual mode escape systems for effecting the escape of a man at low and high vehicle speeds.

Thus, a more specific object of this invention is to provide a novel escape system in which a catapult and tractor rocket are used to remove an occupant or other object from a vehicle to a safe altitude for parachute deployment.

Still another object of this invention is to provide a novel catapult-assisted, rocket-extraction escape system wherein the time at which the rocket is launched is so correlated in the escape sequence that it is firing and at the end of its towline tether when the catapulted object reaches a point of separation from the vehicle.

Still a further object of this invention is to provide a novel catapult-assisted rocket-launching apparatus.

Another more specific object of this invention is to provide a novel catapult-assisted rocket-launching apparatus wherein the catapult and launching strokes are effected by gas pressure from a common source.

Still another more specific object of this invention is to provide a novel dual-tube, catapult-assisted, rocket-lanuching apparatus.

Yet another more specific object of this invention is to provide a novel catapult-assisted, rocket launching appratus for effecting the escape of a man from an air or space vehicle wherein the pressurized gases for effecting the catapult and launching strokes are confined against escape to thereby minimize noise and to prevent injury to the man or damage to his recovery equipment.

Still another more specific object of this invention is to provide a novel catapult-assisted, rocket launching apparatus wherein the load carrying catapult and launching tubes are pressurized to prevent column failure.

Futher objects of this invention will appear as the description proceeds in connection with the appended claims and annexed drawings, wherein:

Although the present invention is described herein to be incorporated in an aircraft, it will readily be appreciated that it is equally applicable to numerous other forms of vehicles such as, for example, space vehicles, helicopters, and the like.

Figures 1, 2:
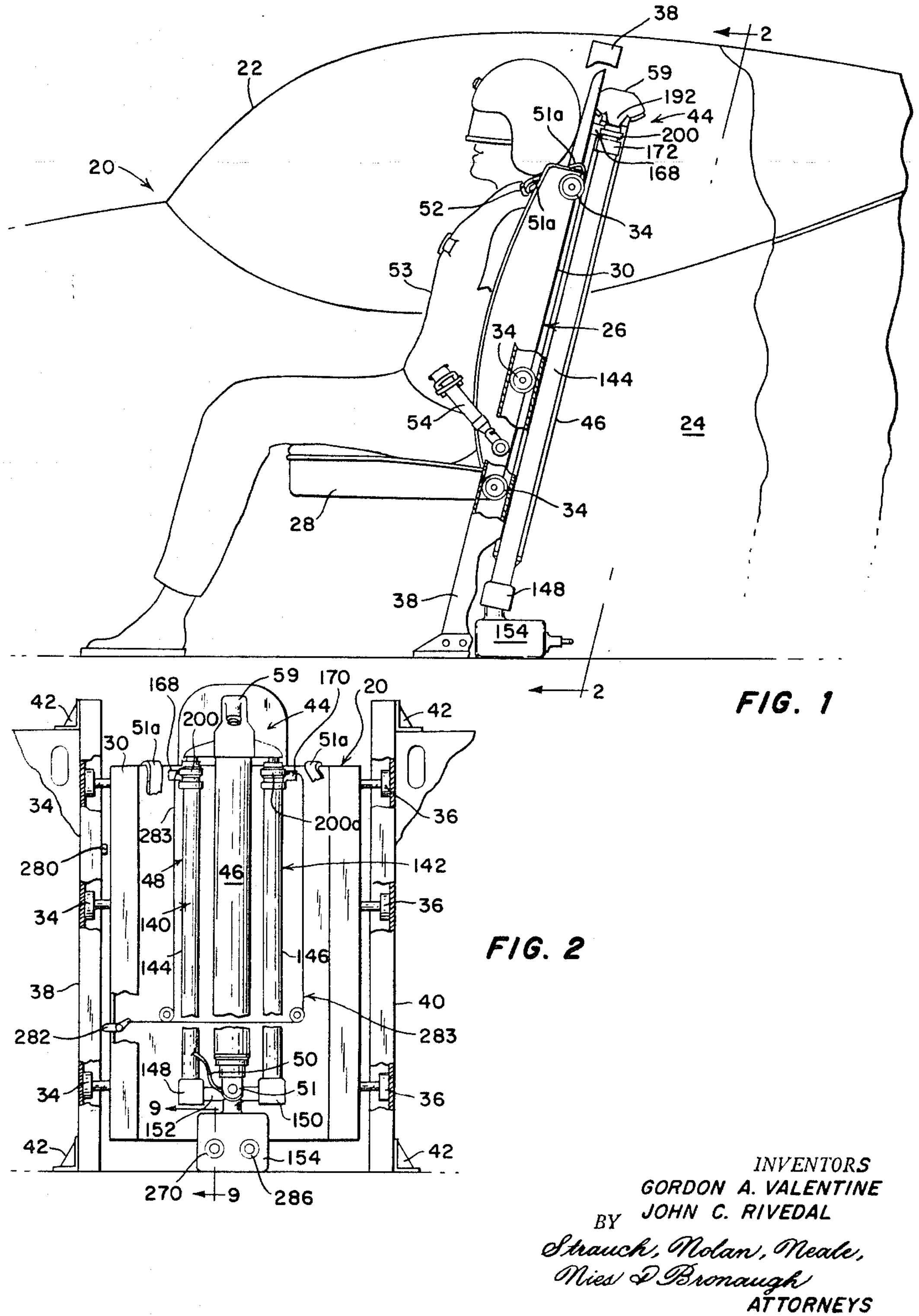
FIGURE 1 is a fragmentary side elevation of the aircraft containing one embodiment of this invention with parts broken away to more clearly illustrate interior details.
FIGURE 2 is a section taken substantially along lines 2—2 of FIGURE 1 and looking forwardly toward the back of the seat assembly illustrated in FIGURE 1.

Referring now to the drawings and more particularly to FIGURE 1 wherein a construction embodying the principles of the present invention is shown, the reference numeral 20 generally designates an aircraft having a conventional jettisonable canopy 22 for enclosing a cockpit 24. Mounted in cockpit 24 is a seat assembly 26 adapted to accommodate a pilot or other occupant and comprising a seat pan 28 and a sea back 30 extending upwardly from pan 28.

As best shown in FIGURE 2, a plurality of vertically spaced-apart guide rollers 34 and 36 are secured to seat back 30 on opposite sides thereof and respectively extend into channel-shaped guide rails 38 and 40. Guide rails 38 and 40 extend upwardly along opposite sides of seat back 30 and are rigidly fixed at opposite ends to the frame of the aircraft by brackets indicated generally at 42.

As shown in FIGURE 2, the catapult-assisted, tractor rocket escape apparatus of this invention is generally indicated at 44 and comprises a tractor rocket 46 and a catapult-assisted rocket launching assembly 48 mounted in the aircraft rearwardly of seat back 30. As will be explained in greater detail later on, seat assembly 26 is catapulted upwardly along guide rails 38 and 40 by assembly 48. Rocket 46 is carried with seat assembly 26 and at or near the end of the catapult stroke, assembly 48 launches rocket 46 upwardly relative to seat assembly 26.

With continued reference to FIGURES 1 and 2, a towline assembly 50 is secured at one end to a swivel assembly 51 which is mounted on the aft end on rocket 46. Towline assembly 50 may be frabricated from any suitable material such as nylon and comprises a bridle **51*a* which is secured to shoulder fittings 52 (one shown in FIGURE 1). Fittings 52 are secured on opposite sides of the man's head to a conventional torso harness 53 which is worn by the occupant of seat assembly 26. A harness belt 54 is provided to strap the occupant to seat assembly 26. Thus, when rocket 46 is launched and ignited to tension towline assembly 50 rocket 46 pulls seat assembly 26 upwardly through harness 53 and belt 54. Alternatively, belt 54 may be released by means to be described later on to pull the man away from seat assembly 26 after it is driven up guide rails 38 and 40. For high speed applications it is preferred that towline assembly 50 be secured directly to seat assembly 26**.

Tractor rocket 46 is provided with sufficient propellant to pull the man or the man and seat assembly 26 to a safe trajectory height. The recoil force produced by launching rocket 46 may optionally be employed to release belt 54 and to push seat assembly 26 away from the man with the result that the man is freed from seat assembly 26 and is pulled upwardly by the tension applied through towline assembly 50 when rocket 46 is ignited.

Seat assembly 26 may be of any suitable, conventional form having relatively fixed seat pan and seat back sections. Where the clearance for ejecting the seat and man from the vehicle is small, however, seat assembly 26 is advantageously provided with a fold-down pan as described in copending application Ser. No. 390,709 filed Aug. 19, 1964 and assigned to the assignee of this application.

Figure 3:
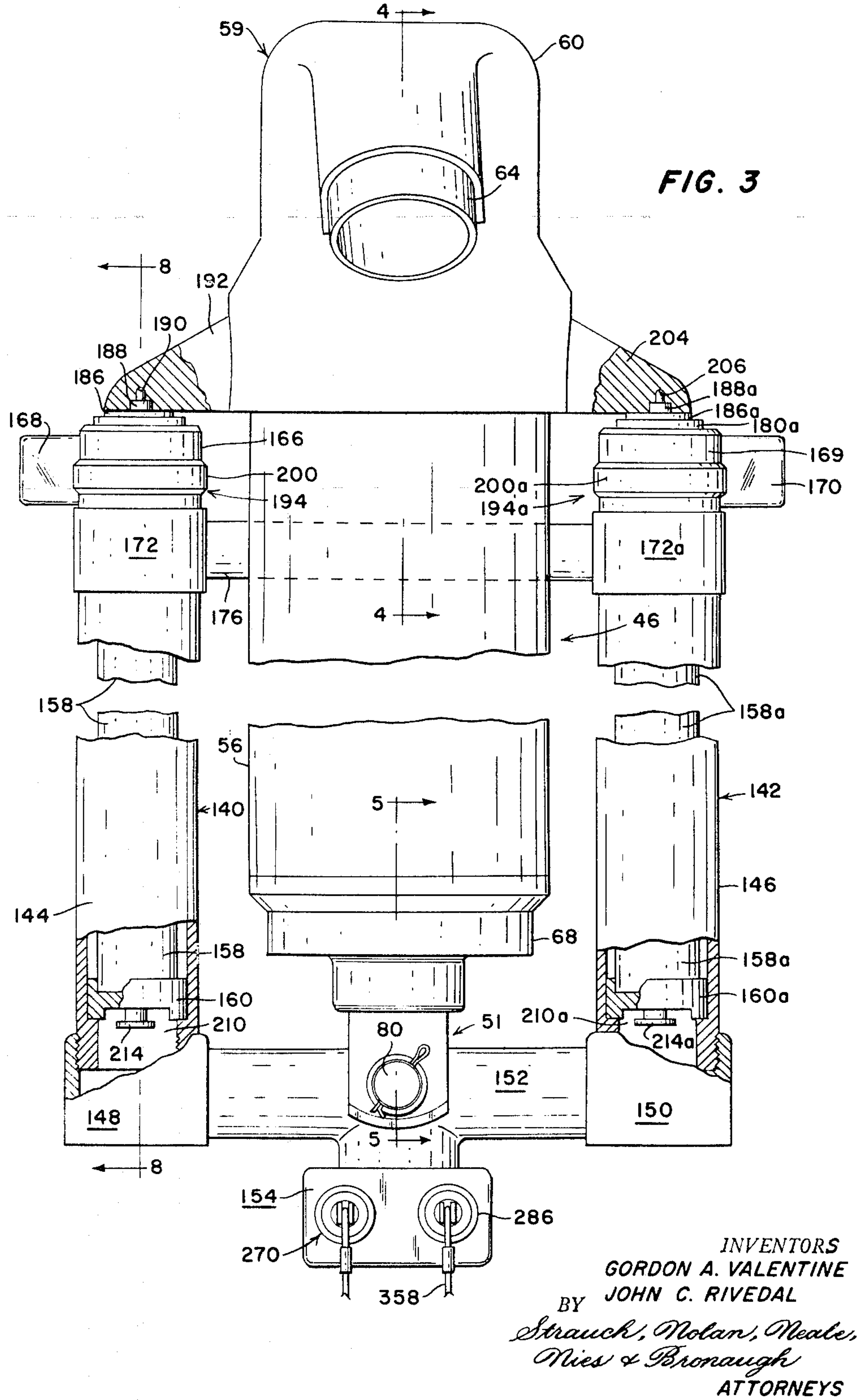
FIGURE 3 is an enlarged partially sectioned elevation of the catapult-assisted escape apparatus as seen from FIGURE 2.
Figure 4:
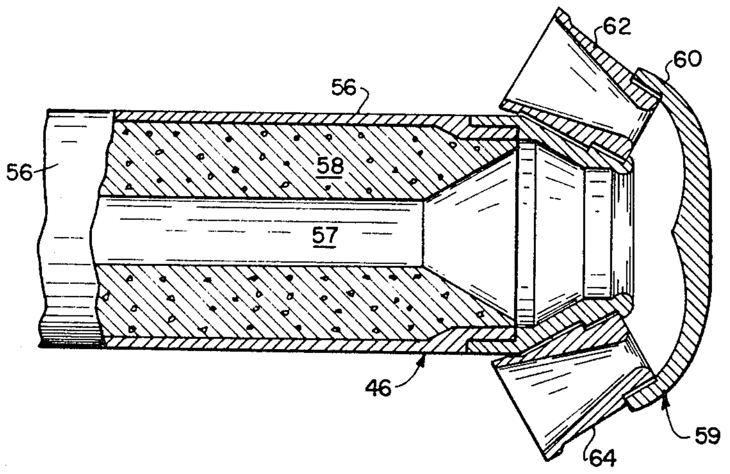
FIGURE 4 is a fragmentary section taken substantially along line 4—4 of FIGURE 3 and illustrating details of the forward end of the rocket.

As shown in FIGURES 3 and 4, rocket 46 is provided with a tubular casing 56 which defines a combustion chamber 57 for receiving a suitable gas-generating propellant indicated at 58. Mounted on casing 56 at the forward end of rocket 46 is nozzle assembly 59 comprising a hollow nose cap housing 60 which mounts a pair of rearwardly and outwardly directed exhaust nozzles 62 and 64. Nozzles 62 and 64 are on diametrically opposed sides of housing 60 and respectively define gas venturi passages which communicate with chamber 57. The gas generated by burning the propellant stored in chamber 57 is exhausted through nozzle 62 and 64 to effectively pull rocket 46 through the air in tractor fashion. Preferably, nozzles 62 and 64 are so directed as to impart to rocket 46, during its ignited flight, a stabilizing spin in a predetermined direction about the rocket longitudinal axis.

Figure 5:
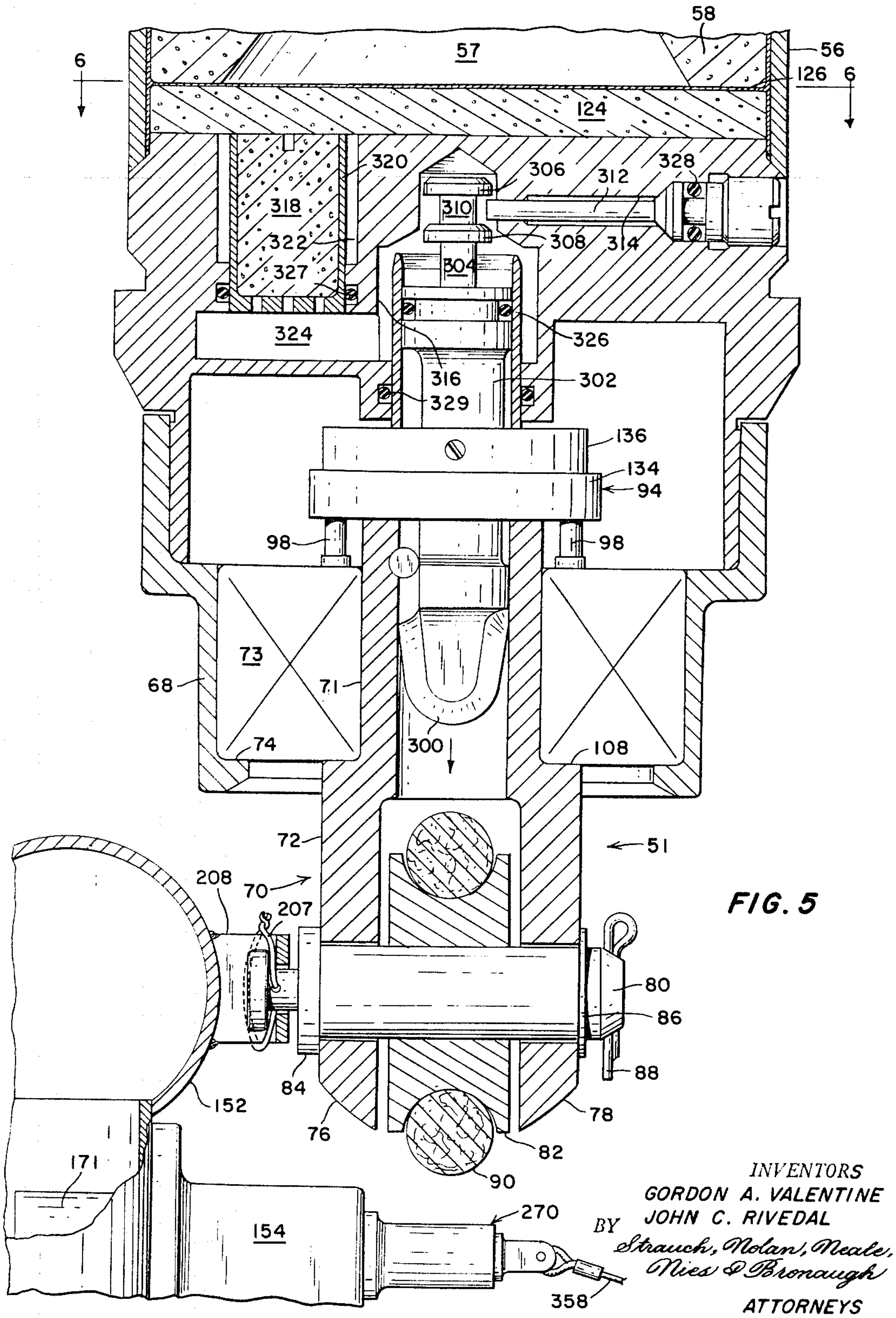
FIGURE 5 is an enlarged, fragmentary section taken substantially along lines 5—5 of FIGURE 3 and illustrating details of the rearward end of the rocket.

Referring now to FIGURE 5, a cylindrical, two-part extension housing 68 is rigidly fixed to the rearward end of casing 56 in axial alignment therewith. Housing 68 mounts swivel assembly 51 and a firing mechanism 69 (see FIGURE 7) for igniting the main body of rocket propellant 58.

As shown, housing 68 is open at its rearward end to coaxially receive a swivel member 70 forming a part of assembly 51. Swivel member 70 is integrally formed with a sleeve section 71 and a yoke section 72. Sleeve section 71 is journalled in housing 68 by an anti-friction thrust bearing assembly 73 which is seated on a lower, radially inwardly extending lip 74 formed integral with housing 68. Yoke section 72 projects beyond the rearward end of housing 68 and is formed with a pair of parallel spaced apart arms 76 and 78 which are integrally joined together at the juncture with sleeve section 71. A short shaft 80 rotatably extending through axially aligned bores in arms 76 and 78 mounts a pulley 82 between arms 76 and 78.

Pulley 82 is medially intersected by the longitudinal axis of rocket 46 and is rotatable about an axis normally intersecting the rocket axis. Shaft 80 is formed with a radial abutment shoulder 84 which is adapted to seat against the outwardly facing surface of arm 76 to limit axial displacement towards the right as viewed from FIGURE 5. The opposite end of shaft 80 mounts a washer 86 between arm 78 and a cotter pin 88. Axial displacement of shaft 80 is thus confined by shoulder 84 and washer 86. Towline assembly 50 is formed with a looped end 90 which is trained around pulley 82. With this swivel assembly construction, it will be appreciated that the man secured to the opposite end of towline assembly 50 is free to swing about the rotational axis of shaft 80 and also to turn about the longitudinal axis of sleeve section 71 to thus prevent bridle **51*a*** from becoming twisted or entangled.

Figures 7, 16:
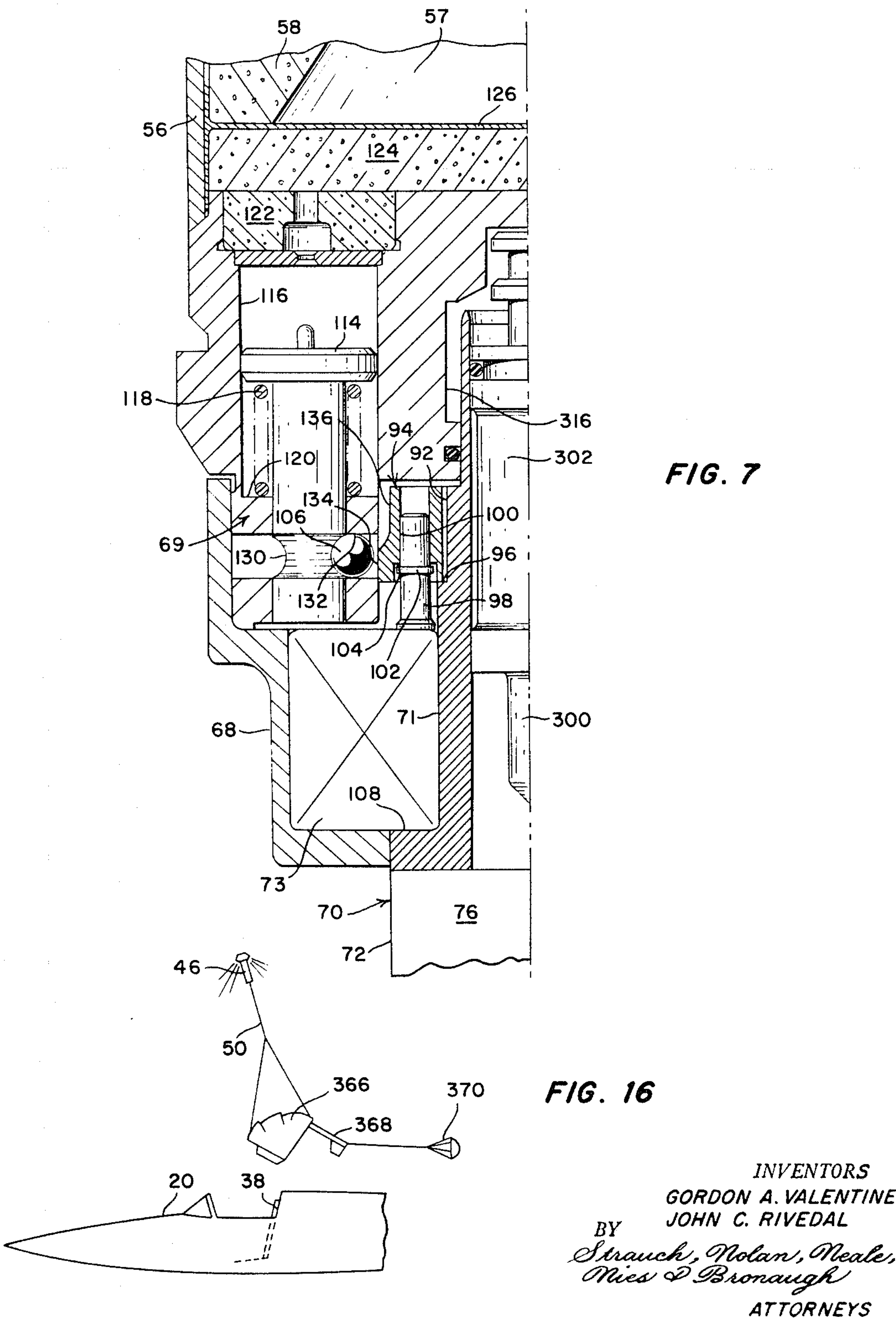
FIGURE 7 is a section taken substantially along lines 7—7 of FIGURE 6.
FIGURE 16 illustrates a side elevation of an aircraft having an encapsulated seat which is separated from the aircraft with the apparatus of this invention.

As best shown in FIGURE 7, the inner end of sleeve section 71 projecting axially beyond bearing assembly 73 is formed with a reduced diametered portion 92 on which a collar 94 is mounted. Collar 94 is suitably, coaxially fixed on sleeve section 71 and axially abuts against an external radially extending shoulder 96 on sleeve section 71.

In the position of parts shown in FIGURES 5 and 7, collar 94 is spaced axially inwardly of bearing assembly 73 by a series of circumferentially, uniformly spaced apart, axially extending pins 98. Pins 98 are seated on the inwardly facing end of bearing assembly 73 and slidably extend into smooth walled, stepped bores 100 formed axially through collar 94. Each pin 98 is formed intermediate its ends with a radially extending, shearable flange 102. A downwardly facing shoulder 104 formed between stepped sections in each bore 100 seats on flange 102 to thus support collar 94 axially above bearing assembly 73 in the positions occupied by the parts when rocket 46 is mounted preparatory to launching. Pins 98, collar 94 and a locking ball 106 (FIGURE 7) cooperate in a manner to be described later on to releasably lock firing mechanism 69 in a cocked position.

In the unlaunched condition of rocket 46 shown in FIGURES 5 and 7, a radial shoulder 108 formed on swivel member 70 at the junction between yoke section 72 and sleeve section 71 is seated against the downwardly facing side of bearing assembly 73. Swivel member 70 is thus confined against axial displacement by abutment of shoulder 108 and pins 98 and the oppositely facing surfaces of bearing assembly 73 prior to the launching of rocket 46 from its mounted position in the parent vehicle. When rocket 46 is launched from the aircraft the tension applied through towline assembly 50 shears off flange 102 on pins 98 and pulls the sub-assembly of swivel member 70 and collar 94 axially downwardly to a position where collar 94 seats on bearing assembly 73.

With continued reference to FIGURE 7, firing mechanism 70 comprises a firing pin 144 which is slidably and coaxially received in a stepped, smooth walled bore 116. Bore 116 is formed in housing 68 along an axis that is parallel to but laterally offset from the longitudinal axis of rocket 46. A coiled helical spring 118 surrounding a reduced diametered shank portion of firing pin 114 reacts against a radial shoulder 120 in bore 116 to bias firing pin 114 forwardly to strike a primer 122. Primer 122 is seated against the underside of a rocket ignition charge 124 which in contained in cup 126. Cup 126 is mounted in the rearward end of casing 56 below propellant 58. Propellant 58 is ignited by charge 124 which, in turn, is ignited by striking primer 122 with firing pin 114.

To retain firing pin 114 in its cocked position shown in FIGURE 7, the shank portion of pin 114 extends rearwardly of shoulder 120 and is formed with a peripheral, radially outwardly opening groove 130 that aligns with a smooth walled, radial bore 132. Bore 132 is formed in housing 68 and extends radially between the shank portion of firing pin 114 and collar 94. As shown, collar 94 is stepped to provide a lower, enlarged diametered section 134 joined to a reduced diametered section 136. When collar 94 is supported in flanges 102 of pins 98, enlarged section 134 radially aligns with and blocks the inner end of bore 132. Ball 106 is displaceably received in bore 132 and seats in groove 130 to releaseably lock firing pin 114 in its retracted, cocked position against the bias exerted by spring 118. The diameter of ball 106 is made sufficiently large relative to the length of bore 132 that collar section 134 prevents ball 106 from being forced out of groove 130 by spring 118.

When flanges 102 are sheared by tensioning towline assembly 50 to move collar 94 downwardly into seating engagement with bearing assembly 73, the reduced diametered section 136 of collar 94 radially aligns with the inner end of bore 132. The periphery of collar section 136 is spaced radially from the inner end of bore 132 by a sufficient distance to allow the bias exerted by spring 118 to urge ball 106 out of groove 130 and into bore 132 where it clears the periphery of the shank portion of firing pin 114. As a result, firing pin 114 is released to be urged upwardly to strike primer 122 and thereby ignite charge 124. Ignition of charge 124 ignites the main body of rocket propellant as previously described. Thus, it is clear that rocket 46 is launched from its stored position in an unignited condition and is ignited upon tensioning of towline 50 which is payed out during the unignited rocket flight.

Figure 6:
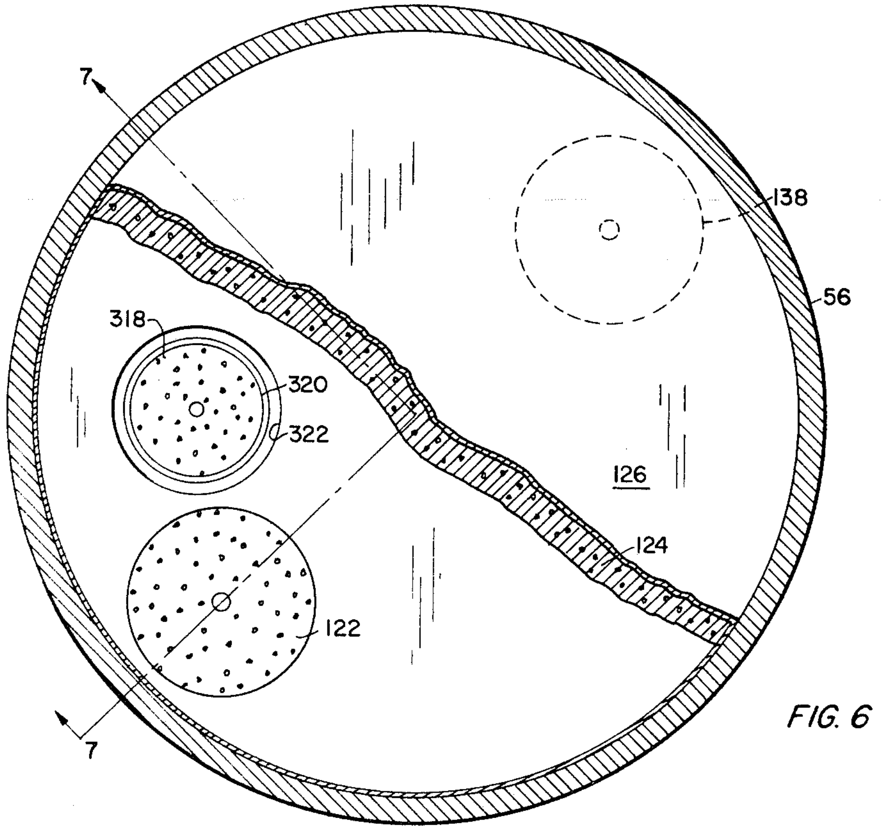
FIGURE 6 is a transverse section taken substantially along line 6—6 of FIGURE 5.

A second unshown firing mechanism of the same construction as mechanism 70 preferably is mounted in housing 68 to fire a further primer indicated at 138 in FIGURE 6. This unshown firing mechanism is releasably locked in its cocked position by the same structure described for mechanism 70 and its actuated simultaneously with firing mechanism 70 to assure ignition of charge 124. In this embodiment, a force of about 15 pounds is required to be exerted through towline assembly 50 for shearing off flanges 102 to shift collar 94 downwardly to its position where firing pin 114 is released for detonating primer 122.

Figure 8:
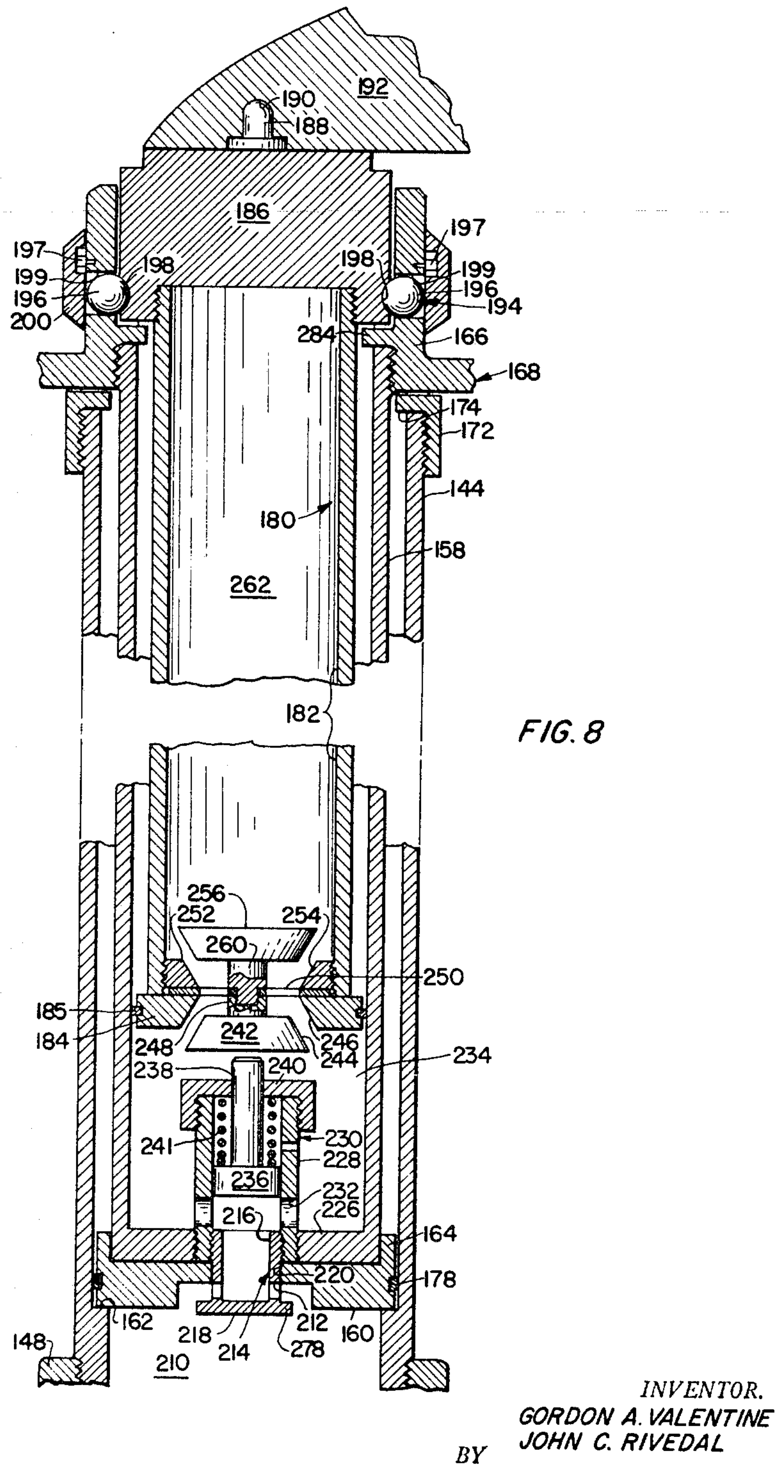
FIGURE 8 is an enlarged fragmentary section taken substantially along lines 8—8 of FIGURE 3.

Referring now to FIGURES 2, 3 and 8, launcher assembly 48 comprises dual catapult-launching units 140 and 142 respectively having parallel catapult tubes 144 and 146 extending longitudinally along diametrically opposite sides of rocket 46. The lower ends of catapult tubes 144 and 146 are threaded into hollow fittings 148 and 150 respectively. Fittings 148 and 150 are rigidly joined to opposite ends of a tube 152. Tube 152 is suitably fixed to and supported by actuator housing 154 which is secured by any suitable means to the aircraft.

The parts of launching units 140 and 142 respectively contained in catapult tubes 144 and 146 are the same and operate in the same manner. Accordingly, only the internal parts of launching unit 140 are shown and will be described in detail, with like reference characters suffixed by the letter *a* being used to designate the corresponding illustrated parts of launching unit 142.

As shown in FIGURE 8 a rocket launching tube 158 forming a part of unit 140 is coaxially received in catapult tube 144 in radially spaced relation to the internal periphery thereof. The lower end of launching tube 158 is separably seated on a catapult piston 160 which is coaxially, slidably received in catapult tube 144. Piston 160 is seated on an annular shoulder 162 formed in the base of catapult tube 144 to support launching tube 158. As shown, piston 160 is formed with an annular axially upwardly extending skirt 164 which extends radially between the opposed peripheries of launching tube 158 and catapult tube 144 to coaxially position launching tube 158 in catapult tube 144.

With continuing reference to FIGURES 2, 3 and 8, the upper end of launching tube 158 projects beyond catapult tube 144 and is coaxially threaded into a tapped boss 166 formed in a rigid support bracket 168. Support bracket 168, as best shown in FIGURE 2, is rigidly fixed by any suitable means to the frame of seat back 30. From this launching and catapult tube construction, it is clear that launching tube 158 is fixed to seat assembly 26 and that catapult tube 144 is fixed to the parent vehicle.

As shown in FIGURES 2 and 3, the upper end of catapult tube 158*a* of unit 142 similarly projects beyond catapult tube 146 and is threaded into a tapped boss 169 formed in a bracket 170. Bracket 170 is suitably fixed to the frame seat back 30 as best shown in FIGURE 2.

Figure 9:
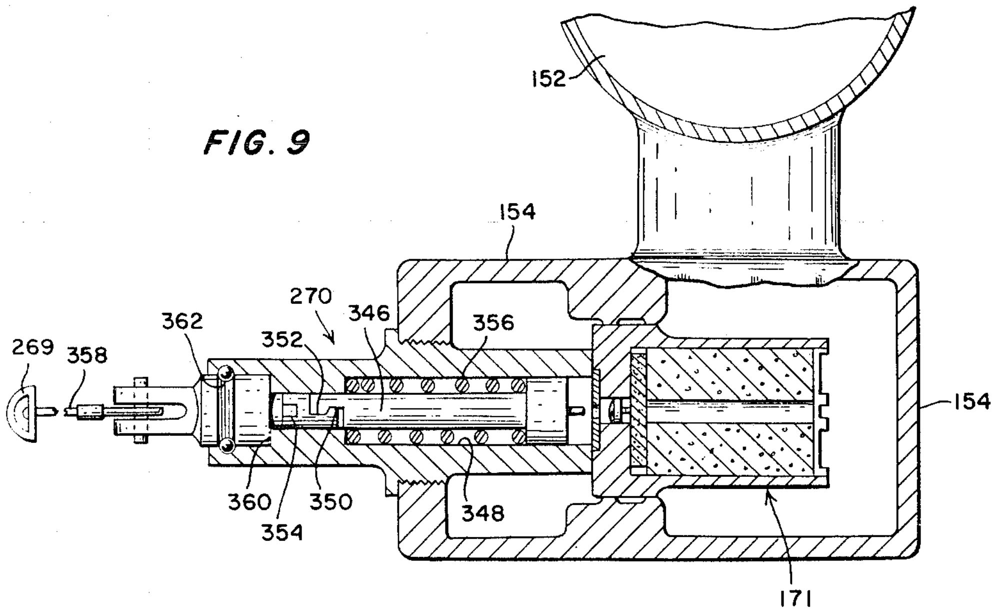
FIGURE 9 is an enlarged fragmentary section taken substantially along lines 9—9 of FIGURE 2.

As shown in FIGURE 9, a cartridge assembly 171 mounted in actuator housing 154 is selectably ignitable in a manner to be described later on to generate gases which flow upwardly through housing 154 and into tube 152. From tube 152, the expanding gases flow through fittings 148 and 150 into catapult tubes 144 and 146 below pistons 160 and 160*a* respectively. The expanding gases urge pistons 160 and 160*a* together with launching tubes 158 and 158*a* upwardly to drive seat assembly 26 upwardly along guide rails 38 and 40.

As shown in FIGURES 3 and 8, a nut 172 threaded onto the upper end of catapult tube 144 is formed with a radially inwardly extending flange portion 174 which provides a stop abutment for engaging with the upwardly facing edge of skirt 164 to prevent piston 160 from being ejected out of catapult tube 144 under the influence of gases generated by cartridge assembly 171. Nuts 172 and 172*a* may be rigidly joined together by a cross-bar 176 (see FIGURE 3) to assure that the upper ends of catapult tubes 144 and 146 are rigidly held in place. A groove-seated, resilient O-ring 178 carried by piston 160 engages the internal periphery of catapult tube 144 to provide a fluid-tight seal for preventing gases from leaking into the annular space between launching tube 158 and catapult tube 144.

As shown in FIGURE 8, a piston assembly 180 comprises a launcher piston tube 182 which is coaxially received in launcher tube 158 in radially spaced relation to the internal periphery thereof. The lower end of piston tube 182 is coaxially fixed to an annular piston disk 184 by unshown, weak screws which are adapted to fail during the escape sequence for a purpose to be described later on. Piston disk 184 is coaxially and slidably received in launcher tube 158 and carries a resilient O-ring 185 which is compressed against the internal periphery of launching tube 158 to prevent escape of cartridge-generated gases. The upper end of piston tube 182 protrudes axially beyond launching tube 158 and is externally threaded to coaxially receive a cap 186. Cap 186 is formed integral with a fitting 188 comprising a semi-spherical member which projects coaxially upwardly from the top surface of cap 186. Fitting 188 is interfittingly seated in a downwardly opening socket 190 formed in a radial arm 192 which integrally extends radially from housing 60 at the forward end of rocket 46.

Piston assembly 180 is releasably locked in its mounted position shown in the drawings by a locking assembly 194 which comprises a plurality of balls 196 seated in outwardly opening, circumferentially spaced apart recesses 198 formed in the skirt portion of cap 186. Balls 196 partially protrude into radial bores 199 formed in the upper part of boss 166. A locking ring 200 peripherally surrounds the upper end of boss 166 to prevent balls 196 from being displaced radially outwardly through bores 199. The diameter of each ball 196 and the length of its associated bore 199 are such that locking ring 200 prevents balls 196 from being displaced from seating engagement in recesses 198. Locking ring 200 is releasably held in its illustrated ball-locking position by small specially constructed pins 197. Pins 197 are threaded into ring 200 and have integral, small shearable posts received in blind, radial bores formed in boss 166. When sufficient axial force is applied to displace locking ring 200 relative to boss 166 and thus to seat assembly 26, the posts of pins 197 shear off allowing locking ring 200 to be displaced to a lowered, ball release position. Thus, locking ring 200 and balls 196 cooperate with cap 186 to releasably lock piston assembly 180 to bracket 168. Locking ring 200 is axially displaceable by means to be described later on to release balls 196 for radial outward displacement through bores 199 whereby piston assembly 180 is released for displacement relative to the assembly of bracket 168 and launching tube 158.

Diametrically opposite arm 192, housing 60, as shown in FIGURE 3, is integrally formed with a further radially extending arm 204 which also has a downwardly opening socket 206 for interfittingly receiving fitting 188*a* of launcher unit 142. Ring 200*a* of locking assembly 194*a* cooperates with boss 169 to releasably secure the rocket launcher piston assembly of unit 142 to the sub-assembly of bracket 170, tubes 158 and 146 and seat assembly 26 in the same manner as described with respect to launcher unit 140. From this construction, it is apparent that the upper end of rocket 46 is supported by seating engagement of arms 192 and 204 on caps 186 and 186*a* which are respectively releasably locked to brackets 168 and 170 on seat assembly 26. Interfitting separable engagement of fittings 188 and 188*a* in their respective sockets 190 and 206 prevents lateral displacement of rocket 46 relative to launching units 140 and 142. When locking assemblies 194 and 194*a* are actuated to release piston assemblies 180 and 180*a* from brackets 168 and 170 respectively, expanding gases fed into lauching tubes 158 and 158*a* eject piston assemblies 180 and 180*a* upwardly to launch rocket 46 from its mounted position on the back of seat assembly 26 in a manner to be described in greater detail later on.

The lower end of rocket 46 may releasably be held in place by a locking wire 207 (FIGURE 5) which is twisted around shaft 80 and a bracket 208. Bracket 208 is suitably fixed to tube 152.

With continued reference to FIGURE 8, the expanding cartridge-generated gases for catapulting seat assembly 26 and for launching rocket 46 enters the lower end of catapult tube 144 which defines with the underside of piston 160 an expansible chamber 210. The expanding gases flow from chamber 210 through a plurality of radial ports 212 in a catapult poppet valve 214. Valve 214 comprises a sleeve section 216 which is closed at its lower end by an end wall 218 and which extends coaxially upwardly through a center aperture 220 in pistion 160. Ports 212 are radially formed in sleeve section 216 to establish fluid communication between the interior of sleeve section 216 and chamber 210.

Launching tube 158 is formed with a centrally apertured bottom wall 226 which seats on piston 160. A sleeve member 228, which forms a part of a housing for a rocket launcher check valve 230, is threaded into the central aperture in wall 226. Sleeve section 216 is threaded into the lower end of sleeve member 228 to provide a weakened connection that is adapted to fail for a purpose to be described shortly.

A shown, sleeve member 228 is formed with radial ports 232 which establish fluid communication between the interior of sleeve section 216 and an expansible rocket launching chamber 234. Chamber 234 is disposed in the lower end of launching tube 158 and is delimited at opposite ends by wall 226 and the underside of piston disk 184.

With continuing reference to FIGURE 8, check valve 230 comprises a valve member 236 slidably received in sleeve member 228 and coaxially fixed to a valve stem 238. Stem 238 extends coaxially upwardly through a centrally apertured cap 240 which is threaded onto the upper end of sleeve member 228. A coiled spring 241 coaxially surrounding stem 238 reacts against cap 140 to bias valve member 236 toward a position for blocking flow of gases through ports 232. Pressurized gases flowing through valve 214 shifts valve member 236 upwardly to establish fluid communication between chambers 210 and 234.

A poppet valve member 242 is provided with an annular, bevelled seating surface 244 which is adapted to engage a bevelled seat 246 formed in piston disk 184. A stem 248 is fixed at opposite ends to valve 242 and to a stem 260 on a launcher piston poppet valve 256, thus axially and radially locating valves 242 and 256. The connection of stem 248 to stem 260 is threaded and weakened so that it will fail for a purpose to be hereinafter explained. Spider 250 comprises a flat-sided member which is clamped between piston disk 184 and a poppet valve seat 252. Valve seat 252 is threadedly received in the lower end of piston tube 182 above spider 250 and piston disk 184. Valve seat 252 comprises an annular member formed with an internal, bevelled seating surface 254 that is adapted to be engaged by poppet valve 256.

A chamber 262 is defined by the interior of piston tube 182 and is delimited at opposite ends by cap 186 and valve seat 252. Poppet valve 256 provides the only inlet to chamber 262 and when engaged with seat 252 blocks flow of gas from chamber 234 and prevents the gases in chamber 262 from escaping.

FIGURE 8 shows the positions of catapult and launcher parts prior to the initiation of the catapult and launch strokes wherein piston tube 182, cap 186, seat 252, piston disk 184, spider 250, and valves 242 and 256 are all rigidly fixed together for displacement as a unit. In the assembly of parts shown in FIGURE 8, therefore, spider 250 axially held against radial or axial displacement to properly aligned valves 242 and 256 with their respective seating surfaces 246 and 254. Spider 250 holds both valves 242 and 256 opened to establish fluid communication between chambers 234 and 262.

To initiate an escape sequence with the apparatus of this invention, the occupant in seat assembly 26 pulls a D-ring 269 (see FIGURE 9) which actuates a firing mechanism 270 for igniting cartridge assembly 171. Firing mechanism 270 will be described in detail later on.

Cartridge assembly 171 preferably is of the delayed type which ignites after a short delay of about one-half second following actuation of firing mechanism 270. This time delay is provided to cut away or otherwise remove canopy 22 prior to catapulting seat assembly 26 and launching rocket 46. Linear-shaped charges (not shown) may advantageously be fired by pulling D-ring 269 to effect removal of canopy 22.

The expanding, cartridge-generated gases flow through tube 152 and enter chamber 210 through the lower end of catapult tube 144. The gases filling chamber 210 flow into chamber 234 through ports 212 which at this stage of the sequence are open. The cartridge-generated gases entering sleeve member 228 displace valve member 236 to its opened position. As a result, gases flow into chambers 234 and 262 through valves 242 and 256 which are presently open.

The cartridge-generated gases also flow through tube 152 into the lower end of catapult tube 146. The flow of gases in catapult tube 146 is the same as that described for tube 144. Since both units 140 and 142 function in the same manner, it will be appreciated that in explaining the operation of unit 140, the same operation of unit 142 is being carried out simultaneously so that catapulting and launching forces are symmetrically balanced.

Figures 10, 11, 12, 13:
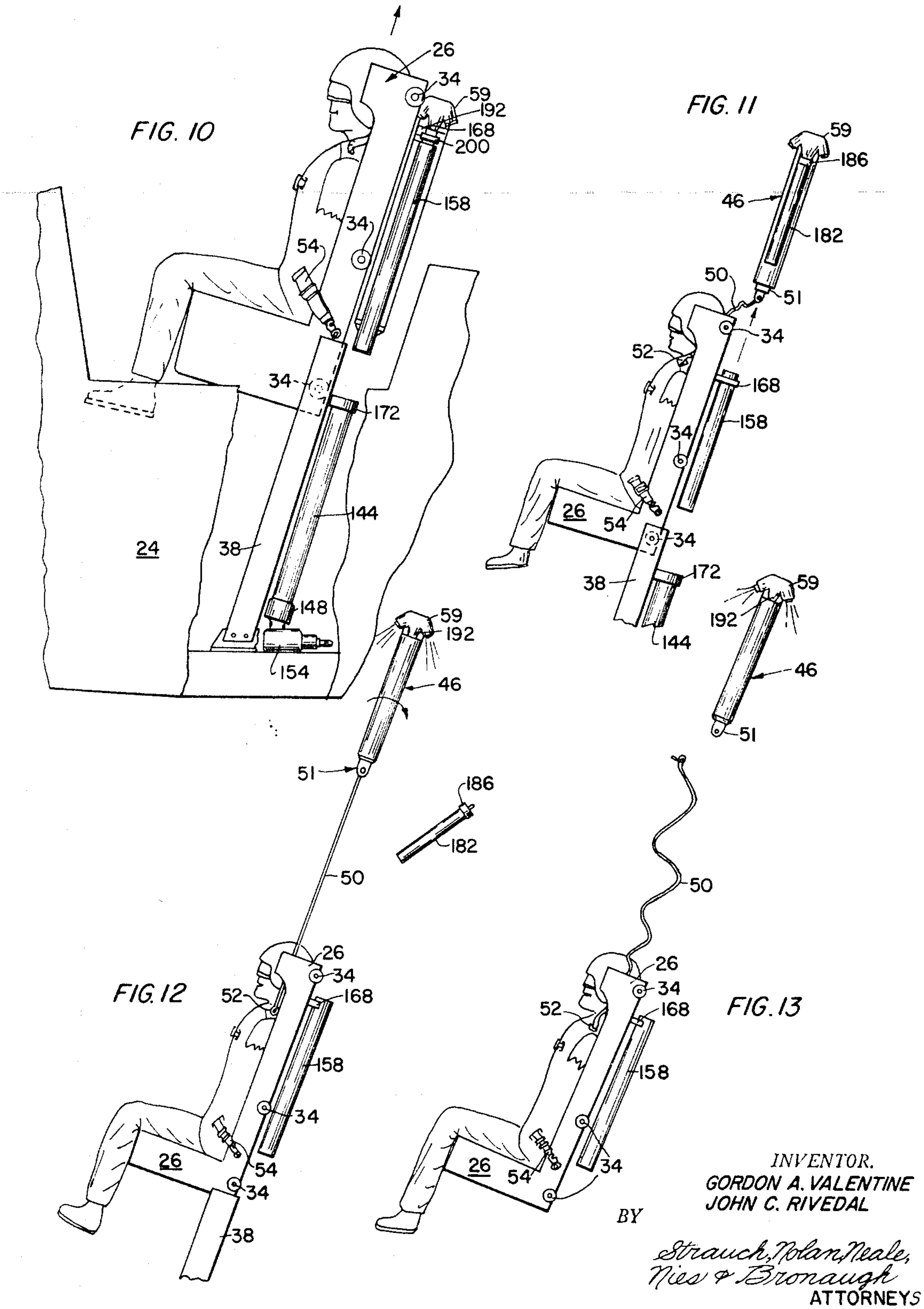
FIGURES 10, 11, 12 and 13 illustrate the preferred sequence of steps for making an escape with the apparatus of this invention.

The pressure of the gases entering chamber 210 starts the catapult phase of the sequence by ejecting catapult piston 160 upwardly to advance launching tube 158 and the parts secured to tube 158 ahead of it. Since launching tubes 158 and 158*a* are fixed at this stage to seat assembly 26 by locking assemblies 194 and 194*a*, upward advancement of launching tubes 158 and 158*a* drive seat assembly 26 upward along rails 38 and 40 as shown in FIGURE 10. Rocket 46 being engaged by fittings 188 and 188*a* is catapulted upwardly with seat assembly 26.

When piston 160 reaches the upper end of catapult tube 144 its upward motion is arrested by abutment with the underside of flange 174. The momentum imparted to launching tubes 158 and 158*a*, however, causes tubes 158 and 158*a* to advance upwardly and out of catapult tubes 144 and 146 urging rocket 46 and seat assembly 26 out of the aircraft cockpit.

When the upward displacement of piston 160 is stopped by flange 174, valve 214 is pulled upwardly by continued upward advancement of tube 158, sliding sleeve section 216 through the interfitting center aperture in piston 62 until a radial flange 278 formed integral with end wall 218 butts against the underside of piston 160. In this upwardly displaced position of valve 214, ports 212 are disposed above piston 160 with the result that further flow of gases through valve 214 is blocked. Closing of valve 214 at this stage prevents escape of gases from chambers 234 and 262 to assure that a maximum gas pressure delivered through chamber 210 is stored in chambers 234 and 262 for launching rocket 46.

Continued upward motion of launching tube 158 after flange 278 butts against the underside of piston 160 causes the threaded connection between sleeve section 216 and housing 228 to fail, thereby freeing valve 214 from valve 230 and launching tube 158 which continues to advance upwardly as a unit. Valve 214 is held by the gas pressure in chamber 210 in its upwardly displaced position where ports 212 are disposed above a plane containing the underside of piston 160. As a consequence, the hot, pressurized gases in chamber 210, tube 152, and housing 154 are confined and thus cannot escape to exterior regions where they may objectionably contact the man during the escape sequence. Confinement of the catapult gases in this manner also reduces the noise or blast resulting from ignition of cartridge assembly 171 and the resulting gas expansion.

As shown in FIGURE 2, a lock release trip 280 comprising a suitable rigid member is fixed to the frame of the aircraft in the path of a lever 282 pivotally mounted on seat back 30. Lever 282 is connected by cables 283 to locking rings 200 and 200*a*. When launching tubes 158 and 158*a* are ejected upwardly, lever 282 strikes trip 280 to pull locking rings 200 and 200*a* downwardly. As a result, balls 196 are released from locking engagement with caps 186 and 186*a* to thereby release piston assemblies 180 and 180*a* for axial displacement relative to launching tubes 158 and 158*a*.

When piston assembly 180 is released from launching tube 158, the gas pressure confined in chambers 234 and 262 ejects piston assembly 180 upwardly and out of launching tube 158. Piston assembly 180*a* is simultaneously ejected out of launching tube 158*a* in the same manner. Upward ejection of piston assemblies 180 and 180*a* launches rocket 46 in an unignited condition from its mounted position on the back of seat assembly 26 as shown in FIGURE 11. Locking rings 200 and 200*a* may be released to start the rocket launching phase shortly before the catapult stroke is completed (i.e., before pistons 160 and 160*a* strike the respective flanges on caps 172 and 172*a*). It is generally preferred that rocket 46 is at or very near the end of its tether provided by towline assembly 50 and firing when seat assembly 26 reaches its point of separation from the aircraft. However, it will be appreciated that rocket 46 may be launched to pull towline assembly 50 taut and thus to ignite shortly after seat assembly 26 separates from the aircraft.

The upward displacement of piston disk 184 in launching tube 158 is arrested to complete the launching stroke by an annular flange 284 (see FIGURE 8) extending radially into the space between piston tube 182 and launching tube 158. Flange 284 is preferably formed integral with boss 166 above the threaded connection to launching tube 158.

When piston disk 184 strikes the underside of flange 284, it stops and is pulled apart from piston tube 182 which continues to move upwardly under the influence of momentum. When the upward motion of piston disk 184 is arrested by flange 284, valve 256 is held stationary relative to launcher tube 158 through stem 260 and spider 250, the latter being fixed to piston disk 184. Thus, continued upward movement of piston tube 182 moves seat 252 into engagement with valve 256. Closing of valve 256 in this manner prevents the gases in chamber 262 from escaping.

When seat 252 engages valve 256, the latter is pulled upwardly along with piston tube 182, causing axial separation between piston disk 184 and spider 250. As a result, valve 256, which is presently being carried upwardly on valve seat 252 pulls valve 242 upwardly through the connection provided by stems 248 and 260. Since piston disk 184 at this stage is held against the underside of flange 284 by the trapped gas pressure in chamber 234, valve 242 is moved upwardly into engagement with seating surface 246 on piston disk 184. The angle of inclination of the mating, bevelled seating surfaces on piston 184 and valve 242 is such that upward motion of valve 242 relative to piston 184 is arrested by engagement with seating surface 246. Piston tube 182, however, continues to move upwardly carrying valve 256 along with it with the result that the threaded connection between valve stems 248 and 260 fails. Closing of valve 242 prevents further escape of gases from chamber 234. Valve 242 is held closed by the gas pressure trapped in chamber 234.

From the foregoing, it is apparent that chamber 210 is sealed off upon the completion of the catapult stroke and that chambers 234 and 262 are individually sealed off upon the completion of the rocket launching stroke. Accordingly, no hot gases are permitted to escape to regions where they may injure the man or damage his recovery equipment. Also the noise or blast resulting from catapulating seat assembly 26 and launching rocket 46 is eliminated by preventing the cartridge-generated gases from escaping. It is also to be noted that the catapult phase and the rocket launching phase are both advantageously effected by a common pressure generating source, namely cartridge assembly 171. A second firing mechanism and cartridge assembly 286 (see FIGURE 2) is connected to D-ring 269 for simultaneous operation with firing mechanism 270 and cartridge assembly 170 to assure that gases are generated for the catapult and launching phases in the event a malfunction occurs to prevent ignition of cartridge assembly 171. It will be appreciated that instead of cartridge assembly 171 any other suitable source of gas pressure may be employed such as, for example, a pressurized gas bottle.

It is apparent from the foregoing description that the combined catapult and rocket launching apparatus is exceptionally compact to conserve space and minimize the weight of the escape system. It also is to be noted that pressurization of catapult tubes 144 and 146, launching tubes 158 and 158*a*, and the piston tubes 182 (one shown) of assemblies 180 and 180*a* throughout the escape sequence eliminates column failure to assure the safe and reliable ejection of the man from the aircraft.

When rocket 46 is launched from its mounted position on the back of seat assembly 26, it moves upwardly relative to seat assembly 26 to tension towline assembly 50. Tensioning of towline assembly 50 pulls swivel member 70 and collar 94 downwardly, shearing shoulders 102 on pins 98 and seating collar 94 on bearing assembly 73. Downward displacement of collar 94 to its seated position on bearing assembly 73, as previously explained, releases locking ball 106 from seating engagement in groove 130 with the result that firing pin 114 is released to be forwardly biased by spring 118 to strike primer 122 and thereby ignite charge 124. Ignition of charge 124 ignites the main body of rocket propellant 58. Thus, it is clear that rocket 46 is not ignited until towline assembly 50 is pulled taut.

Ignited flight of rocket 46, as shown in FIGURE 12, pulls seat assembly 26 and the man upwardly and away from the aircraft to a safe height where a suitable recovery parachute (not shown) may be deployed and opened. Preferably, the recovery parachute assembly described in copending application Ser. No. 470,111 filed on July 7, 1965 and assigned to the assignee of this application is used to recover the man or the seat and the man together. Towline assembly 50 is about six feet in length so that the man and seat assembly 26 trail at a safe distance remotely behind the rearward end of rocket 46. When piston tubes 182 of assemblies 180 and 180*a* clear launching tubes 158 and 158*a*, they separate from rocket 46 as shown in FIGURE 12.

To release the man from rocket 46 after he reaches a safe height, a towline cutter 300, as shown in FIGURE 5, is fixed to the rearward end of a piston 302 which is slidably received in sleeve section 71 above pulley 82. Piston 302 is integrally formed with a coaxial extension 304 which extends through and beyond the upper end of sleeve section 71. The upper protruding end of extension 304 is provided with axially spaced annular shoulders 306 and 308 which define an annular radially outwardly opening groove 310. Received in groove 310 is the forward end of a shear pin 312 mounted in a transverse bore 314. Bore 314 is formed in housing 68 and normally intersects a longitudinal bore 316 formed coaxially in housing 68. The upper ends of sleeve section 71 and extension 304 are freely received in the inner end of bore 316 as shown. Shoulder 306 is seated on the forward end of shear pin 312 to releasably retain cutter 300 in a retracted, inoperative position vertically above pulley 82.

In addition to igniting the main body of rocket propellant, charge 124 ignites an auxiliary propellant charge 318 which is contained in an upwardly opening metal well 320 having an apertured bottom. Well 320 is mounted in longitudinal bore 322 formed in housing 68 along an axis that is parallel to but laterally offset from bore 316. The lower end of bore 322 communicates with the inner end of bore 316 through a cross passage 324.

Charge 318 is sized to burn out just prior to burnout of propellant 58 to thereby expose the apertured bottom of well 320 to chamber 57 in rocket 46. As a result, the gases generated by burning the remaining portion of rocket propellant in chamber 57 flow through the apertured bottom of well 320 and through passage 324 into the inner end of bore 316. The expanding gases entering bore 316 apply pressure to the inner end of piston 302 to shear off the inner end of pin 312. Thus released, piston 302 and cutter 300 are downwardly ejected to a position where the knife edge of cutter 300 engages and severs the looped portion of towline assembly 50 trained around pulley 82. The man and seat assembly 26 are thus released from rocket 46 as shown in FIGURE 13. At this stage of the escape sequence, rocket 46 has sufficient propellant left to fly a sufficient distance away from the man to permit safe development of his recovery parachute.

To prevent escape of the gases entering the inner end of bore 316 and acting on piston 302, four resilient, groove-seated O-rings 326, 327, 328 and 329 are provided for. O-ring 326 is carried by piston 302 to establish a fluid tight seal around the inner periphery of sleeve section 71. O-ring 327 is carried in bore 322 to establish a fluid tight seal around the outer periphery of well 320. O-ring 328 is carried by the outer end of pin 312 to provide a fluid tight seal around the inner periphery of bore 314. O-ring 329 is seated in an annular groove opening into bore 316 and surrounds the periphery of sleeve section 71 to provide a fluid tight seal to prevent gases from escaping through bore 316. With this construction the hot gases generated in chamber 57 are allowed to escape to the exterior of rocket 46 only through nozzles 62 and 64. The man and his recovery equipment being remote from the forward end of rocket 46 thus are not effected by the escaping rocket gases.

Figure 14:
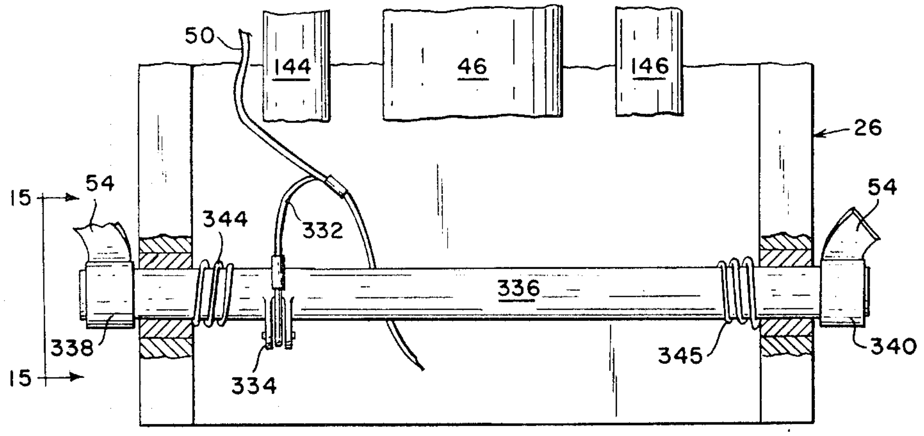
FIGURE 14 is a partially sectioned, fragmentary elevation of the rear of the seat assembly illustrating a modified embodiment of this invention.
Figure 15:
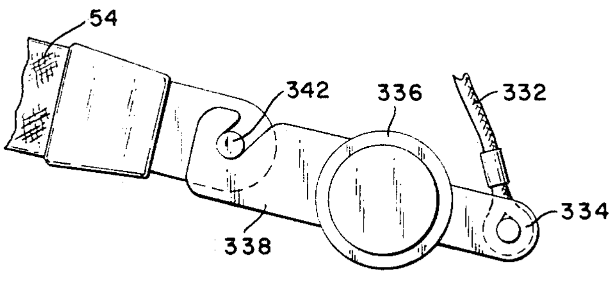
FIGURE 15 is an enlarged, fragmentary section taken substantially along lines 15—15 of FIGURE 14.

If it is desired to release the man from seat assembly 26 at the end of the seat catapult stroke, a lanyard 332, as shown in FIGURES 14 and 15, is secured to towline assembly 50 and to an arm 334. Arm 334 is fixed to a tube 336 which is rotatably mounted on the frame of seat assembly 26 across the rear of seat back 30. Fixed on opposite ends of tube 336 are hooks or suitable fittings 338 and 340 which engage with pins 342 (one shown in FIGURE 15) secured to opposite end sections of seat belt 54. Tube 336 is biased by torsion springs 344 and 345 in a clockwise direction as viewed from FIGURE 15 to retain engagement of fittings 338 and 340 with pins 342. When towline assembly 50 is pulled taut by launching rocket 46, lanyard 332 is pulled taut to rotate tube 336 in a counterclockwise direction against the bias of springs 344 and 345 to release fittings 338 and 340 from pins 342, thereby releasing the man from seat asembly 26. Lanyard 332 is designed to fail after having actuated the mechanism for releasing the man from seat assembly 26. Ignited flight of rocket 46 thus pulls the man from seat assembly 26 through the connections of shoulder fittings 52 to towline assembly 50.

As shown in FIGURE 9, firing mechanism 270 may be of any suitable, conventional form and is shown to essentially comprise a firing pin 346 which is slidably, coaxially received in a stepped bore 348 formed in housing 154. The rearward end of firing pin 346 is formed with a notch 350 which interfittingly engages with a notch 352 formed in a cylindrical disconnect pin 354. Disconnect pin 354 is slidably, coaxially received in bore 348 rearwardly of firing pin 346. A coiled spring 356 surrounding a reduced, cylindrical shank section of firing pin 346 reacts against an internal shoulder in bore 348 to bias firing pin 346 toward an operative cartridge igniting position.

With continuing reference to FIGURE 9, disconnect pin 354 is connected by a schematically illustrated, motion transmitting cable 358 to D-ring 269. In the inoperative position of D-ring 269 and the parts of firing mechanism 270, firing pin 346 is held in an uncocked position by engagement of disconnect pin 354 against an internal shoulder 360 formed in bore 348. When D-ring 269 is pulled by the occupant of seat assembly 26, pins 346 and 354 through their interlocking notched ends are both pulled outwardly to compress spring 356. When the notched ends of pins 346 and 354 are withdrawn into an enlarged end bore section 362 of stepped bore 348, sufficient clearance is provided to allow pin 354 to laterally disengage from firing pin 346. As a result, firing pin 346 is free to be urged forwardly by spring 356 to ignite cartridge assembly 171.

Seat assembly 26, if desired, may be replaced with an encapsulated seat 366 as shown in FIGURE 16. In this embodiment, rocket 46 is launched and ignited in the manner previously described to pull seat 366 upwardly and away from the parent vehicle as shown. Seat 366 may be provided with suitable stabilization boom and fin assembly 368 and a small stabilization parachute 370 if desired.

Figure 16A:
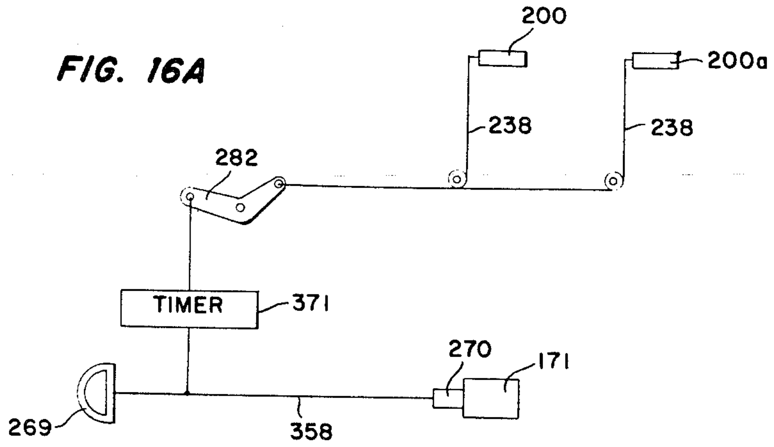
FIGURE 16A is a generally schematic view of a further modified embodiment of this invention.

In place of trip 280, a timer 371 of any suitable conventional form may be connected to lever 282 and to D-ring 269 as shown in FIGURE 16A. Pulling D-ring 296 arms timer 371 simultaneously with the actuation of firing mechanism 270. After a short time delay, timer 371 is actuated to pivot lever 282 in a direction for shifting locking rings 200 and 200*a* to their ball-releasing position, allowing rocket 46 to be launched from its mounted position on seat back 30. The time delay of timer 371 is advantageously set so that rocket 46 is at the end of its tether and firing when seat assembly 26 reaches its point of separation from the aircraft or very shortly after seat assembly 26 separates from rails 38 and 40. If desired, timer 371 may be set to release piston assemblies 180 and 180*a* for launching rocket 46 after seat assembly 26 separates from the aircraft.

Figure 16C:
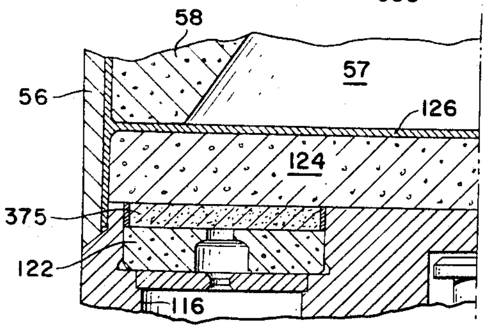
FIGURES 16B and 16C illustrate a modified arrangement for igniting the rocket shown in FIGURES 1–15.
Figures 16B, 25:
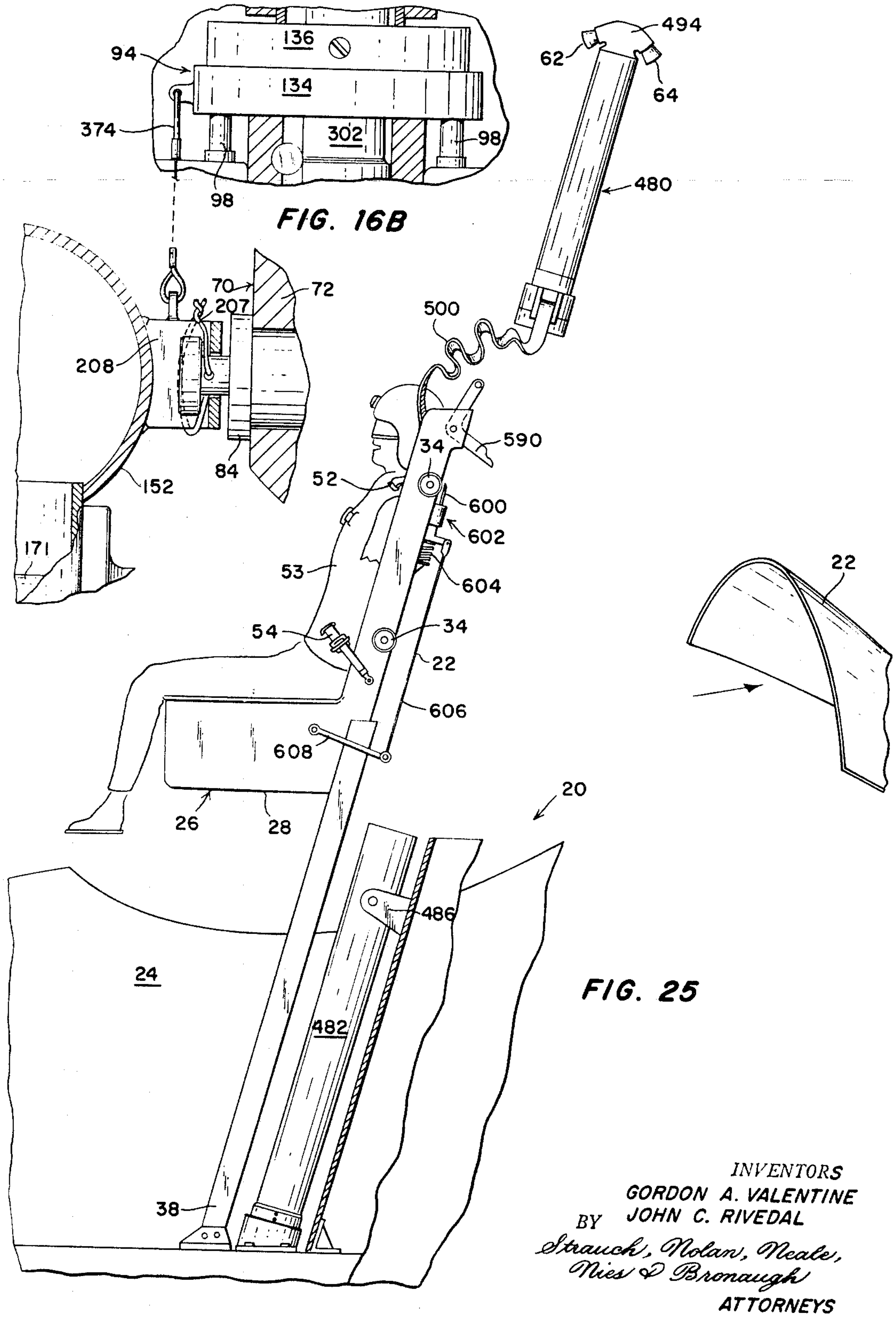
FIGURE 25 is a side elevation similar to FIGURE 19, but showing the position of components near the end of the catapult stroke.

Instead of actuating the rocket firing mechanism 69 by pulling towline 50 taut, actuation of mechanism 69 may be accomplished prior to the towline assembly becoming tight. Actuation could occur at the start of the launching stroke by means of a link 374 as shown in FIGURE 16B. Link 374 is connected to collar 94 and to a suitable part such as bracket 208 such that the tension resulting from launching rocket 46 shears off shoulders 102 on pins 98 and pulls collar 94 downwardly into seating engagement on bearing assembly 73, thereby actuating firing mechanism 69 in the manner already described. After actuating firing mechanism 69, link 374 is designed to fail. To afford the necessary time delay when firing mechanism 69 is actuated at the start of the launching stroke, a ballistic time delay train 375 is disposed between primer 122 and charge 124. This time delay train 375 may be of any suitable conventional form and essentially comprises a pellet charge having a known burning rate to provide a time delay for igniting charge 124 after firing mechanism 69 is actuated. This time delay preferably is set so that rocket ignition occurs near the time when towline assembly 50 becomes taut.

Figure 17:
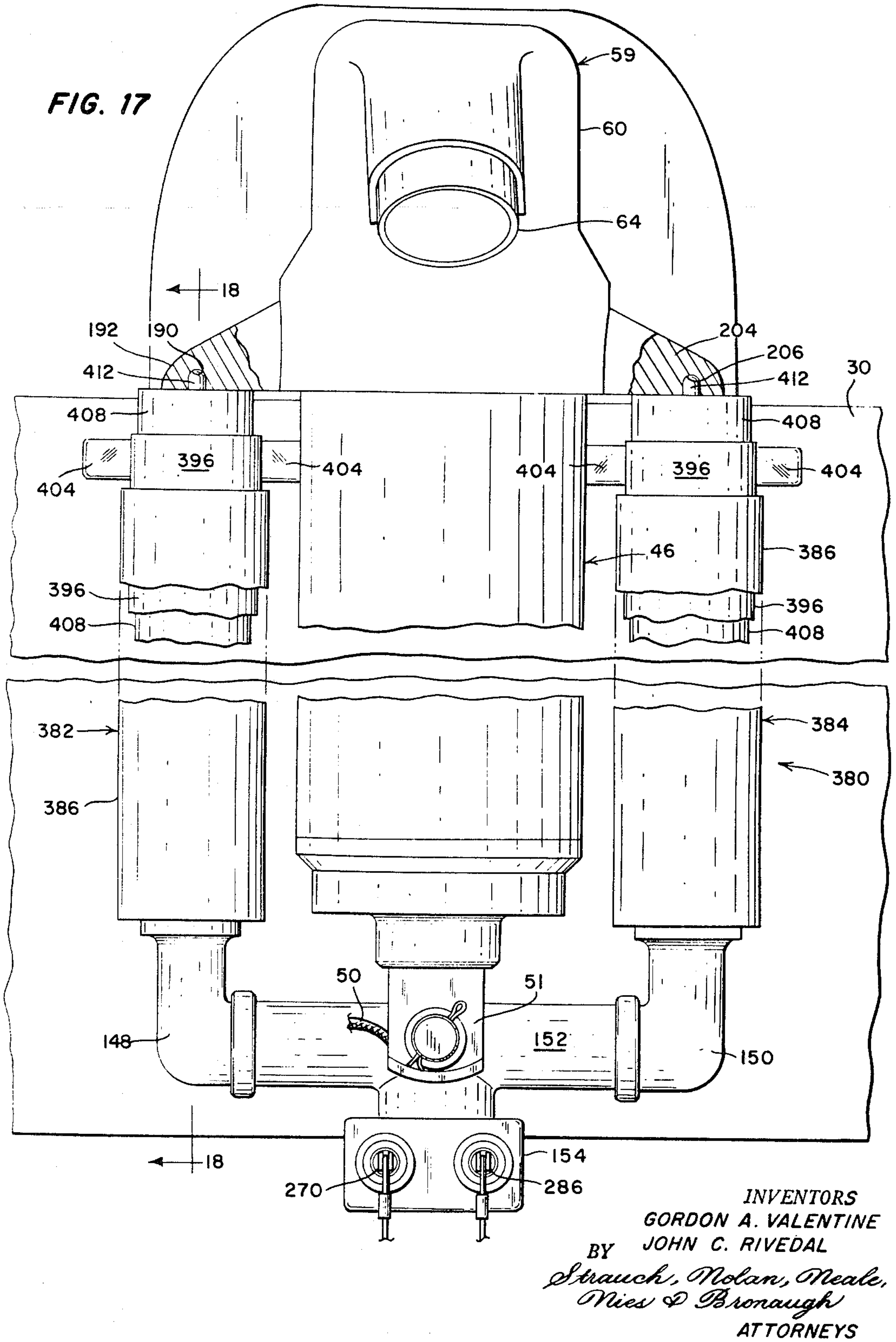
FIGURE 17 is a partially sectioned elevation of a modified form of catapult-assisted, rocket launching apparatus.
Figure 18:
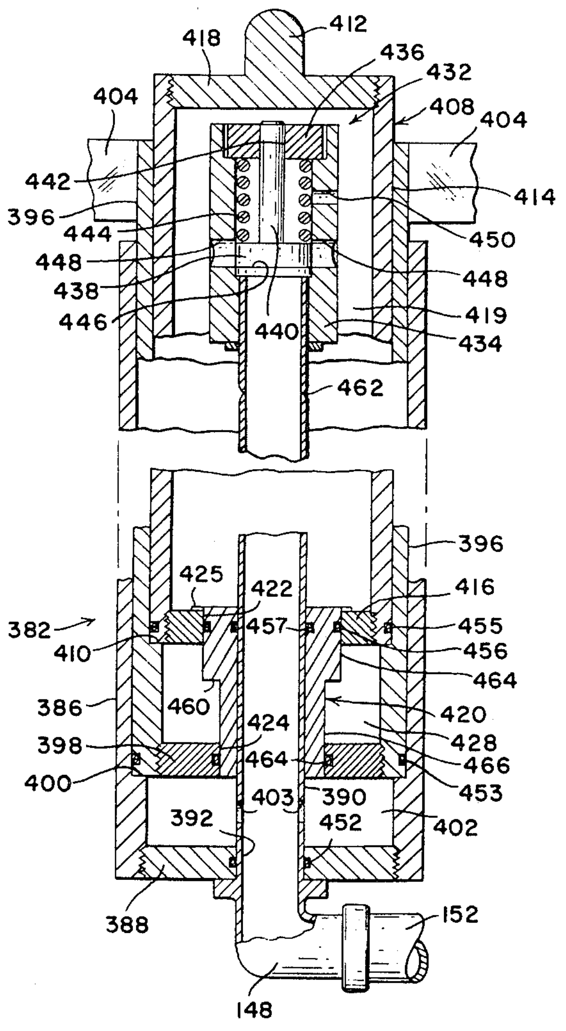
FIGURE 18 is a section taken substantially along lines 18—18 of FIGURE 17.

FIGURES 17 and 18 illustrate a modified form of catapult and rocket launching apparatus 380. To the extent that this embodiment is the same as the previous embodiments, like reference numerals have been used to identify like parts.

As shown in FIGURES 17 and 18, apparatus 380 comprises a pair of dual catapult and rocket launching units 382 and 384 disposed on opposite sides of rocket 46. Unit 382, as best shown in FIGURE 18, comprises a catapult tube 386 having an end wall 388. Tube 386 is fixed to fitting 148 and to the frame of the aircraft by any suitable means.

With continuing reference to FIGURE 18, a thin tube 390 formed rigid with fitting 148 extends upwardly through a central bore 392 formed in wall 388 for directing the expanding cartridge-generated gases into the interior of unit 382. Slidably, coaxially received through the open upper, open end of catapult tube 386 is a launching tube 396 which is open at its upper end and closed at its lower end by a wall 398. Wall 398 is separably seated on an upwardly facing annular shoulder 400 formed in catapult tube adjacent to the lower end thereof. An expansible catapult chamber 402 formed in the lower end of catapult tube 386 is delimited at opposite ends by end walls 388 and 398. Expanding cartridge-generated gases in tube 390 flow through radial ports 403 into chamber 402. The upper end of launching tube 396 protrudes axially beyond catapult tube 386 and is fixed to seat back 30 by suitable brackets 404.

With continuing reference to FIGURE 18, a launcher piston 408 is slidably, coaxially received in launching tube 396 and is separably seated at its lower end on an upwardly facing, annular shoulder 410 formed in launching tube 396. The upper end of launcher piston 408 projects axially beyond launching tube 396 and is coaxially formed with a fitting 412 which is interfittingly received in socket 190 in nozzle housing 60. Launcher piston 408 comprises a tubular section 414 which is closed at opposite ends by walls 416 and 418 to define a chamber 419. A sleeve 420 axially aligning with bore 392 slidably extends through axially aligned bores 422 and 424 respectively formed in end walls 416 and 398. Sleeve 420 is formed at its upper end with a thin, shearable radial flange 425. Flange 425 is seated on upper face of wall 416 to retain sleeve 420 in bores 422 and 424. An annular, expansible, rocket launching chamber 428 is formed in the lower end of launching tube 396 and is delimited at opposite ends by end walls 398 and 416.

Still referring to FIGURE 18, tube 390 slidably extends through sleeve 420 and into chamber 419. A check valve 432 mounted on the upper end of tube 390 in chamber 419 allows gas to flow only from tube 390 into chamber 419. Valve 432 may be of any suitable construction and is shown to comprise a sleeve-shaped housing 434 having an open lower end which coaxially receives the upper end of tube 390 with a fluid-tight fit. Housing 434 is rigidly fixed to tube 390 by any suitable means and is closed at its upper end by an end wall 436. A valve member 438 slidably received in housing 434 above the open upper end of tube 390 is fixed to a stem 440 which coaxially extends through a guide bore 442 in end wall 436. A coiled spring 444 surrounding stem 440 reacts against end wall 436 to bias valve member 438 downwardly into engagement with an annular seat 446 in housing 434.

Housing 434 is formed with radial ports 448 which establish fluid communication between the interior of tube 390 and chamber 419 when sufficient pressure is present in tube 390 to lift valve member 438 off of seat 446. When valve member 438 is engaged with seat 446, it blocks fluid flow through ports 448. A vent hole 450 is provided in housing 434 rearwardly of valve member 438 to prevent gases from being trapped between valve member 438 and end wall 436.

Still referring to FIGURE 18, resilient, groove-seated O-rings 452, 453, and 454 are provided to prevent escape of gases from chamber 402. O-ring 452 is carried by end wall 388 to establish a fluid-tight seal around the periphery of tube 390 extending through bore 392. O-ring 453 is carried by launching tube 396 and establishes a fluid-tight seal around the inner periphery of catapult tube 386 to prevent gases from escaping between tubes 386 and 396. O-ring 454 is carried by end wall 398 and provides a fluid-tight seal around the external periphery of sleeve 420 to prevent gases from escaping between the opposed peripheral wall surface of bore 424 and sleeve 420.

Resilient, groove-seated O-rings 455, 456 and 457 cooperate with O-ring 454 to prevent escape of gas from chamber 428. O-ring 455 is carried by piston 408 and provides a fluid-tight seal around the inner periphery of launching tube 396 to prevent escape of gases between the opposed peripheries of tube 396 and piston 408. O-ring 456 is carried by sleeve 420 and provides a fluid-tight seal around the periphery of bore 422 to prevent escape of gases between the peripheral wall surface of bore 422 and the external periphery of sleeve 420. O-ring 457 is also carried by sleeve 420 and provides a fluid-tight seal around the periphery of tube 390 to prevent escape of gases between the opposed peripheries of tube 390 and sleeve 420. As shown, the only fluid flow passage into chamber 419 in the inoperative position of parts shown in FIGURE 18 is through ports 448.

Catapult and launcher unit 384 is of the same construction as unit 382, like reference numerals being used to identify like parts. Since units 382 and 384 operate in the same manner, only the operation of unit 382 will be described in detail, it being appreciated that the operational steps performed by units 382 and 384 are carried out simultaneously.

When cartridge assembly 171 is ignited by pulling D-ring 269, the hot expanding gases flow through tube 152 and into units 382 and 384. The gases directed into unit 382 flow upwardly through tube 390 and into chamber 402 through ports 403. The cartridge-generated gases in tube 390 also flow through check valve 432 into chamber 419. At this stage, chamber 428 is completely confined against entry of gases. The gas pressure in chamber 402 urges launching tube 396 and piston 408 upwardly along tube 390 and out of catapult tube 386 to catapult seat assembly 26 together with the man and rocket 46 to a point of separation from the aircraft. During this catapult stroke, no cartridge-generated gases have entered chamber 428 with the result that launching tube 396 and piston 408 are unitarily moved upwardly. Check valve 432 keeps the gas pressure in chamber 419 near a peak value.

Sleeve 420 is moved upwardly with piston 408 to a position where it strikes the lower end of housing 434 and stops momentarily. Continued upward movement of launching tube 396 and piston 408 under the influence of gas pressure in chamber 402 shears off flange 425, allowing piston 408 to slide over and separate from sleeve 420. Both piston 408 and launching tube 396 now move relative to sleeve 420 until end wall 398 strikes a downwardly facing annular shoulder 460 formed on sleeve 420.

Since tube 390 is fixed to housing 154 which, in turn, is fixed to the aircraft, abutment of the upwardly moving launching tube 396 with shoulder 460 on sleeve 420 places tube 390 under tension. Tube 390, as shown in FIGURE 18, is formed with a peripheral notch 462 to provide a weakened section which fails under the tensioning force exerted by launching tube 396 as it moves upwardly through catapult tube 386.

As shown in FIGURE 18, sleeve 420 is stepped to provide enlarged and reduced diametered sections 464 and 466 which are respectively received in bores 422 and 424. When end wall 398 of launching tube 396 strikes shoulder 460 at the juncture between sections 464 and 466, it pulls tube 390 apart at notch 462.

Bore 422 is made sufficiently large to provide an annular fluid flow passage space around the periphery of housing 434 to thereby establish fluid communication between chambers 419 and 428. The trapped pressurized gas in chamber 419 thus flows into chamber 428 to balance the pressure on the lower end of piston 408. As result of the pressure continuing to act upward on the upper end of piston 408, piston 408 is ejected upwardly and out of launching tube 396 to launch rocket 46 from its mounted position on seat back 30.

A modified rocket and catapult-assisted escape apparatus 478 is shown in FIGURES 19–25. To the extent that the embodiment illustrated in FIGURES 19–25 is the same as the previous embodiments, like reference numerals have been used to identify like parts.

Figure 19:
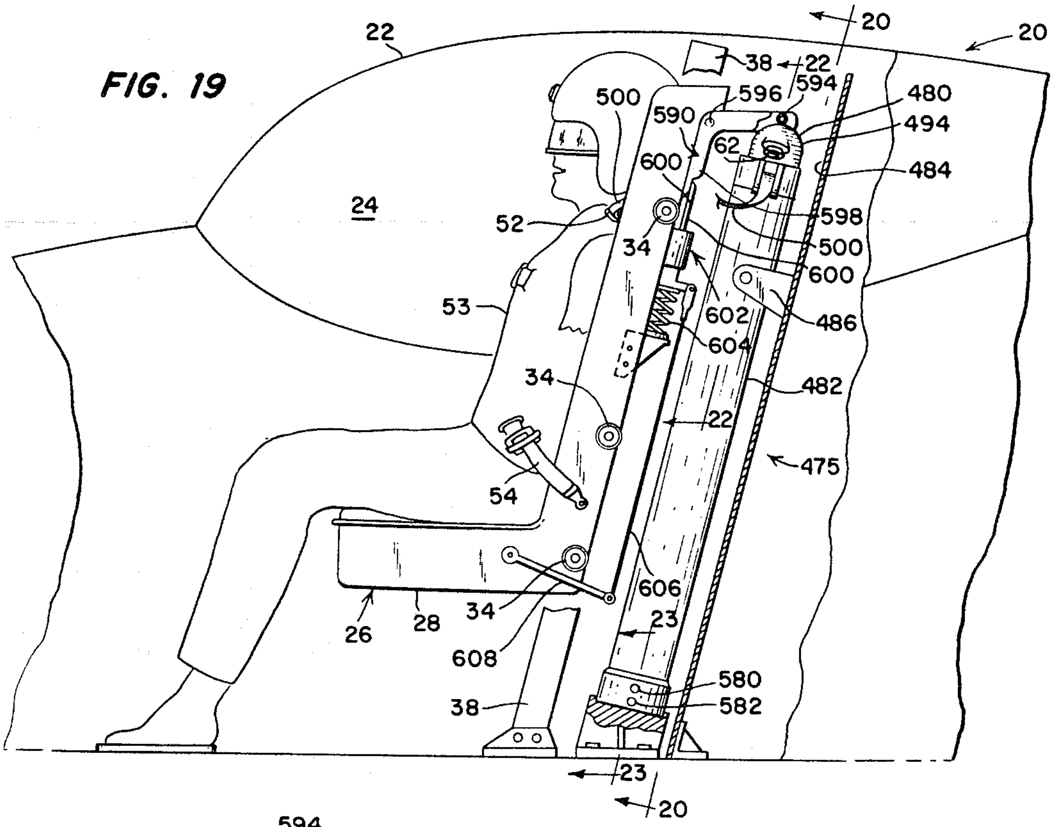
FIGURE 19 is a fragmentary side elevation of an aircraft containing still a further modified embodiment of this invention.
Figure 20:
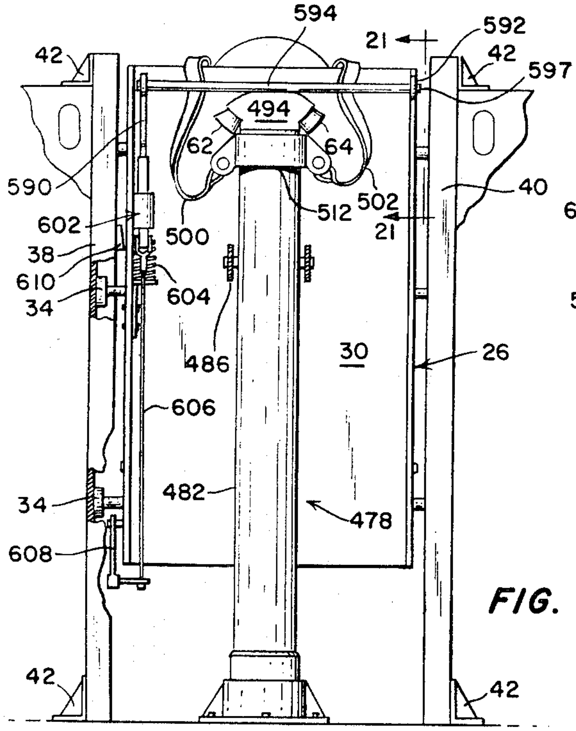
FIGURE 20 is a section taken substantially along lines 20—20 of FIGURE 19 and looking forwardly toward the back of the seat illustrated in FIGURE 19.

Referring to FIGURES 19 and 20 escape apparatus 478 is shown to comprise a tractor rocket 480 coaxially received in an upstanding catapult tube 482. Catapult tube 482 is shown to be parallel with guide rails 38 and 40 and is mounted between seat assembly 26 and a rear bulkhead 484 of the aircraft. Tube 482 extends upwardly about midway between opposite sides of seat back 30 and is rigidly fixed to bulkhead 484 by any suitable means such as a trunnion fitting 486.

Figure 22:
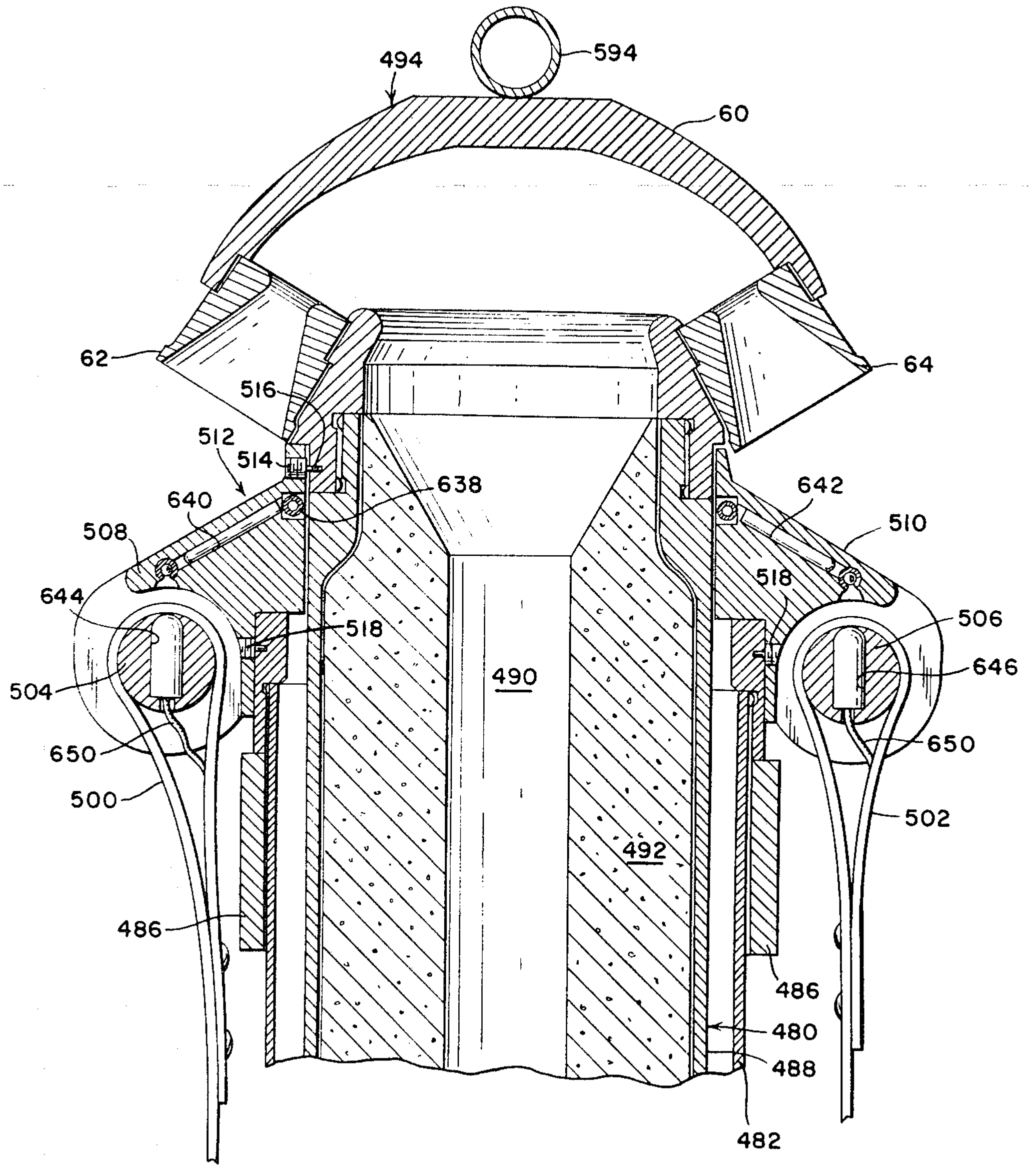
FIGURE 22 is an enlarged longitudinal section taken substantially along lines 22—22 of FIGURE 20 and illustrating interior details of the forward end of the rocket shown in FIGURES 19 and 20.

As best shown in FIGURE 22 rocket 480 comprises a tubular casing 488 which defines a combustion chamber 490 for receiving a suitable gas-generating propellant indicated at 492. Similar to rocket 46, a nozzle assembly 494 is mounted on the forward end of casing 488. Since assembly 494 is the same as assembly 59, like reference numerals have been used to identify like parts. Nozzle assembly 494 protrudes beyond the upper open end of catapult tube 482 when rocket 480 is mounted therein.

With continuing reference to FIGURES 19, 20, and 22, a pair of flexible towlines 500 and 502 are connected at corresponding ends to fittings 52 on opposite sides of the man's head. The opposite ends of towlines 500 and 502 are respectively secured around pins 504 and 506 which, in turn, are respectively fixed to bifurcated, diametrically opposed, radially outwardly extending arms 508 and 510. Arms 508 and 510 are formed integral with a mounting collar 512 through which casing 488 slidably and coaxially extends. When rocket 480 is mounted in catapult tube 482, collar 512 is disposed vertical above catapult tube 482 and is detachably secured to housing 60 by a specially constructed, threaded pin 514. Pin 514 is formed with a small shearable cylindrical post 516 extending into a blind radial bore formed in housing 60. Collar 512 is also detachably secured to catapult tube 482 by threaded pins 518 which are of the same construction as pin 514. When rocket 480 is launched from tube 482, it slides through collar 512 causing a swivel fitting 520 (FIGURE 23) to seat against the underside of collar 512 for a purpose to be explained shortly.

Figure 23:
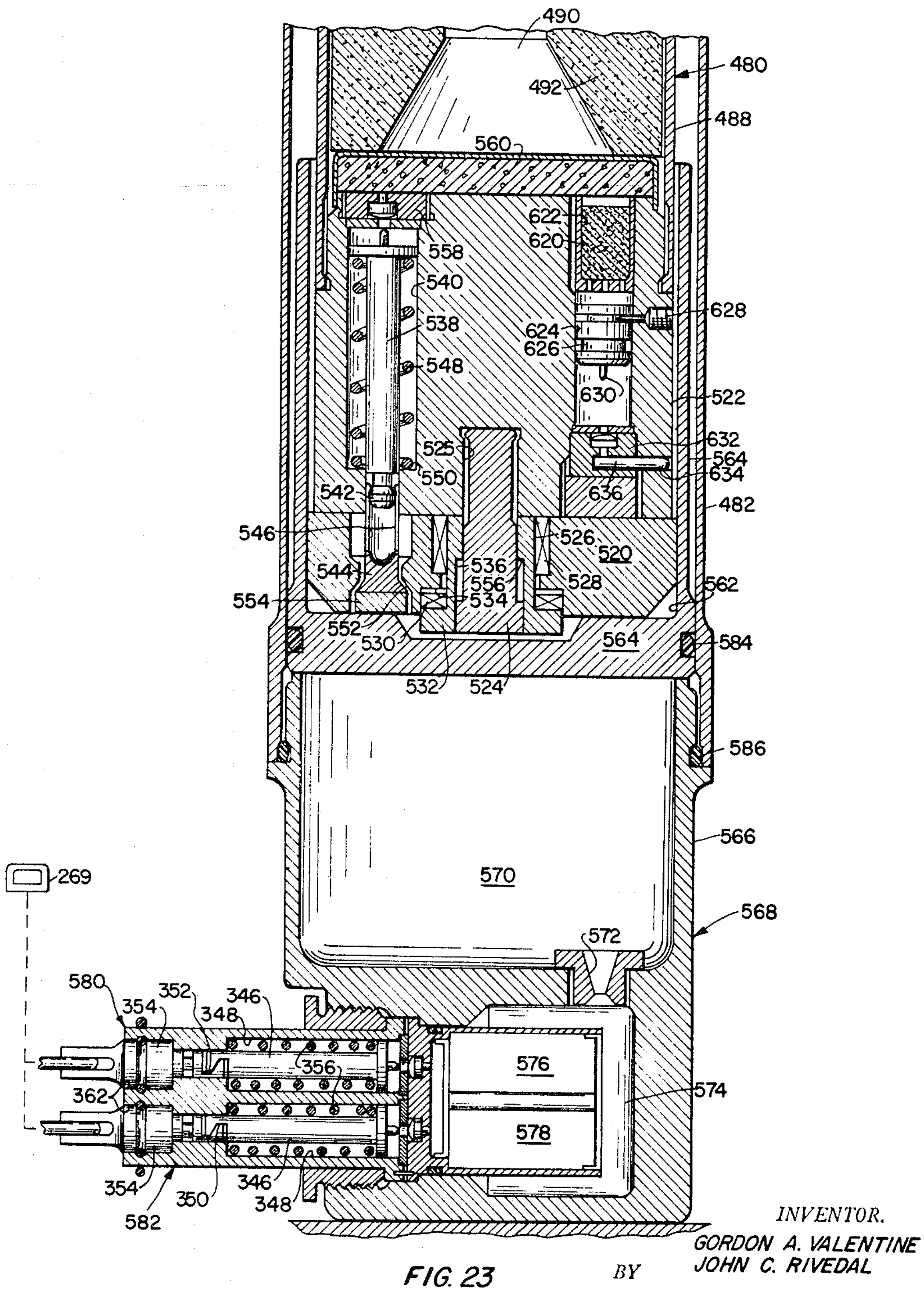
FIGURE 23 is an enlarged fragmentary section taken substantially along lines 23—23 of FIGURE 20 and illustrating interior details of the lower end of the rocket shown in FIGURES 19 and 20.

As shown in FIGURE 23, swivel fitting 522 comprises a flat-sided annular member and is secured to the rear end of an extension housing 522 by a mounting bolt 524. Housing 522 is coaxially fixed to the rearward end of casing 488 by any suitable means. Bolt 524 is threaded into a rearwardly opening, tapped bore 525 formed coaxially in housing 522. As shown, bolt 524 extends rearwardly beyond housing 522 and mounts a bearing retainer sleeve 526. A bearing 528 carried by sleeve 526 rotatably mounts swivel fitting 520.

With continuing reference to FIGURE 23, a thrust bearing 530 spaced rearwardly of bearing 528 is mounted on sleeve 526 and is axially retained between a radial flange 532 and the bottom wall of a rearwardly opening, counterbored recess 534 formed coaxially in fitting 520. Flange 532 is integral with sleeve 526. With this construction, swivel fitting 520 is axially retained between the rearwardly directed end face of housing 522 and flange 532 on sleeve 526.

Still referring to FIGURE 23, mounting bolt 524 is provided at its rearward end with an enlarged head which is slidably received in an enlarged bore section 536 formed coaxially in sleeve 526. Sleeve 526 is axially slidable on mounting bolt 524 between the bolt head and the rearwardly directed end face of housing 522 for a purpose to be explained shortly.

With continued reference to FIGURE 23, the firing mechanism for igniting the rocket propellant 492 is shown to comprise a firing pin 538. Pin 538 is coaxially and slidably mounted in a stepped through bore 540 formed in housing 522 along an axis extending parallel to but laterally offset from the longitudinal axis of rocket 480. The rearward end of firing pin 538 is formed with a knuckle 542 which is coaxially received in a spring tang lock 544. Lock 544 has a tubular section which is slotted to form fingers 546 which snugly grip knuckle 542 to retain firing pin 538 in a rearwardly retracted, cocked position against the bias of a helically coiled spring 548. Spring 548 surrounds a reduced diametered shank section of firing pin 538 and reacts against an internal annular shoulder 550 to bias firing pin 538 forwardly toward a detonating position.

With continuing reference to FIGURE 23, lock 544 extends rearwardly and coaxially through a stepped bore 552 formed in swivel fitting 520. At its rearward end, lock 544 terminates in an enlarged cylindrical section 554. Section 554 seats against a rearwardly directed internal annular shoulder formed in bore 552 to axially retain swivel fitting 520 in abutment with the rearwardly directed end face of housing 522 when rocket 480 is mounted in catapult tube 482.

Figure 24:
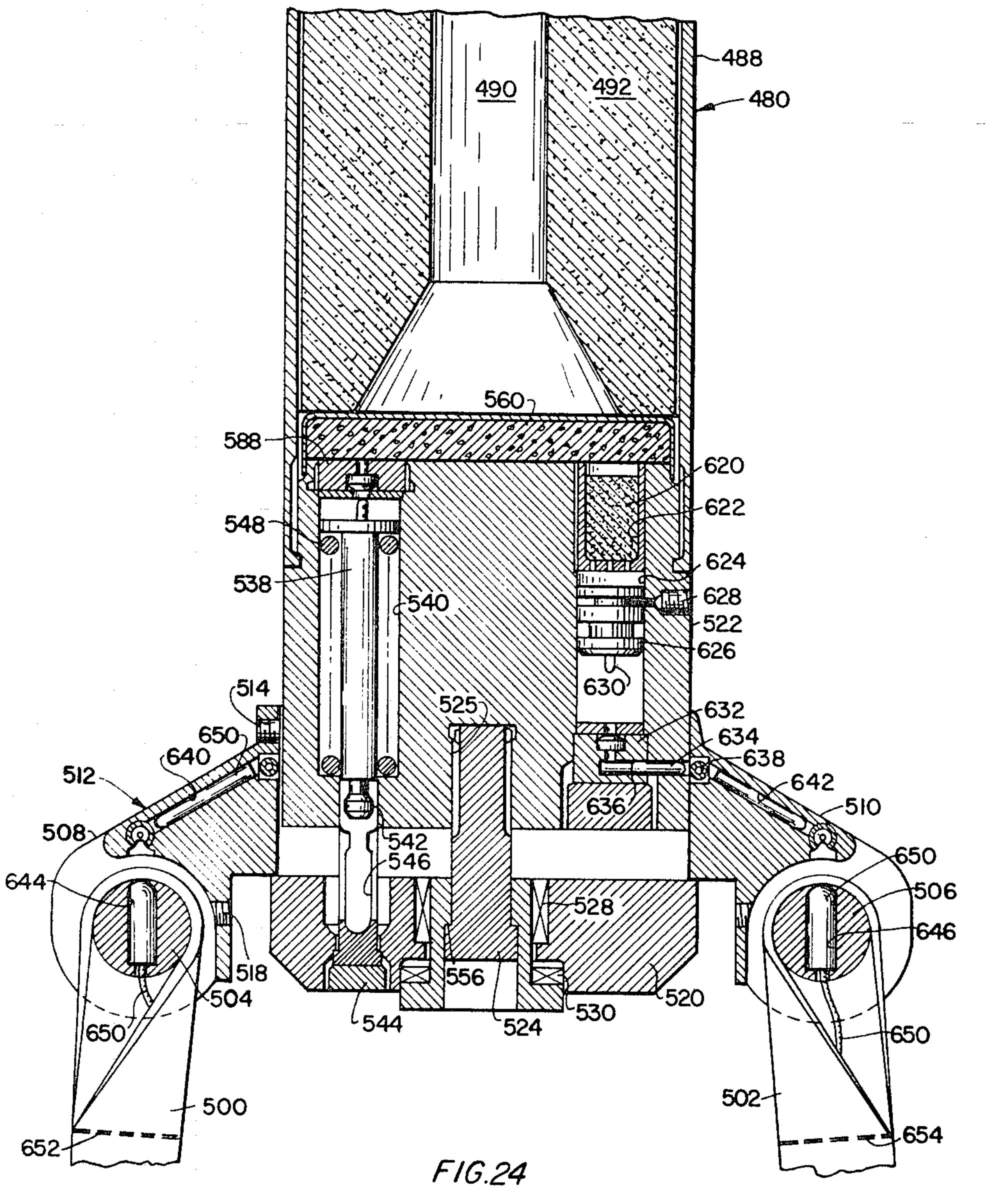
FIGURE 24 is a view similar to FIGURE 23 but showing the rocket parts in rocket-igniting positions.

When rocket 480 is launched from tube 482, collar 512 seats on fitting 520 (see FIGURE 24) so that the tension applied through towlines 500 and 502 displaces swivel fitting 520 and sleeve 526 axially rearwardly to the position shown in FIGURE 24 where a rearwardly facing internal, annular shoulder 556 formed in sleeve 526 abuts the head of mounting bolt 544. As a result of this motion, lock 544 and firing pin 538 are pulled axially rearwardly with swivel fitting 520 to compress spring 548. When the ends of fingers 546 clear the rearward edge of stepped bore 540, knuckle 542 is released with the result that firing pin 538 separates from lock 544, permitting spring 548 to urge pin 538 forwardly to a position where it strikes a primer 558. Primer 558 ignites a charge 560 disposed in the rearward end of casing 488. Ignition of charge 560 ignites the main body of rocket propellant 492 in the same manner as described in the embodiment of FIGURES 1–15.

Housing 522 also mounts a second firing mechanism (not shown) which is of the same construction as the firing mechanism just described for igniting charge 560 and which is simultaneously actuable with the firing mechanism just described to ignite charge 560 when towlines 500 and 502 are pulled taut.

As shown in FIGURE 23, extension housing 522 is slidably and coaxially received in a forwardly opening bore 562 formed in a catapult and launching piston 564. Piston 564 is slidably and coaxially received in catapult tube 482 which extends upwardly in radially spaced relation to casing 488. The lower end of catapult tube 482 coaxially receives a cylindrical section 566 of a breach block housing 568. Catapult tube 482 is threadedly fixed to section 566. Housing 568 is suitably fixed to the aircraft along with catapult tube 482.

Still referring to FIGURE 23, section 566 is coaxially formed with a smooth, cylindrically walled, upwardly opening recess to define a pressure chamber 570 which is exposed to the rearwardly directed end face of piston 564. Pressure chamber 570 communicates through a venturi passage 572 with a combustion chamber 574 formed in a breach block housing 568.

As shown in FIGURE 23, two conventional gas-generating cartridge assemblies 576 and 578 provide a source of fluid pressure and are mounted in combustion chamber 574. Cartridge assemblies 576 and 578 have suitable charges of propellant which are ignitable by respectively actuating firing mechanisms 580 and 582. Firing mechanisms 580 and 582 may be of any suitable form and are shown to be of the same construction as firing mechanism 270. Firing mechanisms 580 and 582 are actuated by pulling D-ring 269 in the same manner as mechanism 270. The gases resulting from igniting cartridges assemblies 576 and 578 pass upwardly through venturi passage 572 into pressure chamber 570 to act on piston 564.

As shown, a groove seated resilient O-ring 584 carried by piston 564 provides a fluid-tight annular seal between piston 564 and the internal, cylindrical wall surface of catapult tube 482. O-ring 584 cooperates with a further resilient O-ring 586 disposed between overlapping ends of housing section 566 and catapult tube 482 to completely seal chambers 570 and 574, thereby preventing escape of the gases generated by igniting cartridge assemblies 576 and 578.

Figure 21:
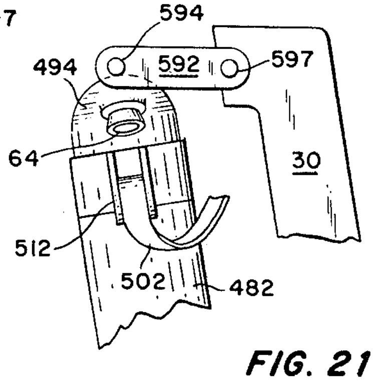
FIGURE 21 is a fragmentary section taken substantially along lines 21—21 of FIGURE 20.

Referring to FIGURES 19–21, the structure for applying the gas pressure in chamber 570 to drive seat assembly 26 upwardly along guide rails 38 and 40 is shown to comprise a pair of levers 590 and 592 and a rigid tube 594. Levers 590 and 592 are pivotally mounted by axially aligned pins 596 and 597 on opposite sides of seat back 30 adjacent to the upper end thereof. Levers 590 and 592 are thus swingable about a common axis extending at right angles to and forwardly offset from the longitudinal axis of rocket 480 for a purpose to be explained later on. Tube 594 is parallel with pins 596 and 597 and is fixed at opposite ends to levers 590 and 592 so that it can be swung upwardly and forwardly to a position above the upper end of seat back 30 where it is out of the launching path of rocket 480 as shown in FIGURE 25. In the inoperative position of parts shown in FIGURE 20, tube 594 extends horizonally across the rear of seat back 30 and rests on the top of the rocket nozzle housing 60.

As best shown in FIGURE 19, lever 590 is formed with a downwardly extending arm portion 598 which is releasably engaged by a locking tongue 600 of a latching mechanism 602. Tongue 600 is slidably received in a housing 604 fixed to seat back 30. A spring 604 reacting upwardly against a surface on seat back 30 biases tongue 600 into engagement with the lower end of arm portion 598 to prevent counterclockwise displacement of lever 590. With tongue 600 engaging arm portion 598, therefore, tube 594 is held in its position where it is seated on the top of rocket nozzle housing 60. Rocket 480 thus is axially clamped between tube 594 at its upper end and piston 564 at is lower end. Piston 564, as shown in FIGURE 23, is seated on the upper end of the housing section 566.

As shown in FIGURES 19 and 20, the lower end of locking tongue 600 is secured by a cable 606 to a lever 608 which is pivotally mounted on the lower end of seat assembly 26. Lever 608 is adapted to strike a rail trip 610 upon predetermined catapulted movement of seat assembly 26 upwardly along guide rails 38 and 40. Engagement of lever 608 with rail trip 610 causes lever 608 to pivot downwardly to pull tongue 600 downwardly to a position where it disengages from arm portion 598.

In operation of the escape apparatus shown in FIGURES 19–25, D-ring 269 is pulled by the occupant of seat assembly 26 to jettison canopy 22 and to actuate firing mechanisms 580 and 582. Cartridge assemblies 576 and 578 ignite after a short delay to generate gases which flow upwardly through passage 572 and into chamber 570 where they act on piston 564. Piston 564 is thus ejected upwardly, pushing rocket 480 ahead of it. Engagement of nozzle housing 60 with tube 594 transmits the upward motion of rocket 480 to drive seat assembly 26 upwardly along guide rails 38 and 40. At a point in the upward travel of seat assembly 26 and prior to the end of the catapult stroke, lever 608 strikes rail trip 610 to pull locking tongue 600 downwardly against the bias of spring 604. When locking tongue 600 disengages from arm portion 598 of lever 590, tube 594 is swung upwardly and forwardly under the upward force exerted by rocket 480 to a position where it is out of the launching path of rocket 480 as shown in FIGURE 25. Thus released, rocket 480 is now launched from catapult tube for upward unignited flight relative to seat assembly 26 as shown in FIGURE 25.

As rocket 480 moves out of catapult tube 482, post 516 of pin 514 is sheared off leaving collar 512 secured only to tube 482 by pins 518. Rocket 480 thus is urged upwardly through collar 512 until piston 564 reaches the upper end of tube 482 where it strikes collar 512 with sufficient impact to shear the posts on pins 518. As a result, collar 512 is freed from catapult tube 482 and moves away from tube 482 at the same velocity as rocket 480. The impact of engaging piston 564 with collar 512 is sufficient to separate piston 564 from rocket 480.

Rocket 480, still unignited, moves out of catapult tube 482 and through the aircraft hatch opening along its launching path with collar 512 being disposed adjacent to the rearward end of casing 488. When rocket 480 reaches the end of towlines 500 and 502, the initial tension applied through lines 500 and 502 pulls on collar 512 to slide it to the aft end of rocket 480 where it shoulders on swivel fitting 520. As a result, swivel fitting 520 is displaced rearwardly to the position shown in FIGURE 24.

By displacing swivel fitting 520 to its rearward position spaced from extension housing 522, lock 544 is pulled from bore 540, permitting firing pin 538 to be urged forwardly under the bias exerted by spring 548 to fire the primer 558. As a result, charge 560 is ignited to cause ignition of the main body of rocket propellant 492. By igniting propellant 492, rocket 480 moves under its own power away from the aircraft to exert an upward pull on the occupant in seat assembly 26. The launching of rocket 480 and ignition of propellant 492 is so correlated that rocket 480 is at the end of its tether and firing when seat assembly 26 reaches a point of separation from the aircraft or shortly after the seat separates from rails 38 and 40.

To release the man from rocket 480 after he is pulled to a safe height for deploying his recovery parachute (not shown), charge 560 ignites a further charge 620 (see FIGURES 23 and 24) simultaneously with the ignition of rocket propellant 492. Charge 620 is contained in an upwardly opening metal well 622 which is formed with an apertured bottom and which is received in a bore 624 formed in extension housing 522 along an axis that is parallel to but laterally offset from the longitudinal axis of rocket 480. A piston 626 is slidably received in bore 624 below well 622 and is held in position by a pin 628 which is of the same construction as pins 514 and 518. A firing pin 630 is mounted on the downwardly facing end of piston 626.

Charge 620 is sized to burn out just prior to burn-out of propellant 492 as described in the previous embodiments. As a result, gases generated by burning the remaining portion of rocket propellant in chamber 490 flow through the apertured bottom of well 622 and into bore 624 to urge piston 626 downwardly.

Downward displacement of piston 626 causes firing pin 630 to strike a primer 632 disposed in the lower end of bore 624. Primer 632 detonates a sheath-contained mild detonating fuse 634 which is contained in a radial bore 636 formed in extension housing 522.

When collar 512 is axially shifted to its rearward position on rocket 480 to displace swivel fitting 520 rearwardly to the position shown in FIGURE 24, bore 636 aligns with an inwardly opening annular recess 638 formed in collar 512. Recess 638 is connected by radial passages 640 and 642 to cross bores 644 and 646 which are respectively formed in pins 504 and 508. Sheath-contained, mild detonating fuses generally indicated at 650 are contained in recess 638, passages 640 and 642, and bores 644 and 646. These fuses extend down along towlines 500 and 502 from arms 508 and 510 and are connected to linear-shaped charges 652 and 654 (see FIGURE 24) which are detonatable to cut lines 500 and 502 for freeing the extracted occupant from rocket 480.

Thus, when firing pin 630 is urged downwardly by the gas pressure flowing through the apertured bottom in well 622, it strikes primer 632 to detonate fuses 650 almost instantly downwardly along lines 500 and 502 with the result that charges 652 and 654 are detonated to sever lines 500 and 502. The man and seat are thus released from rocket 480. At this stage of the escape sequence, rocket 480 has sufficient propellant left to fly a sufficient distance away from the man to permit safe deployment of his recovery parachute as explained in the previous embodiments.

Figure 26:
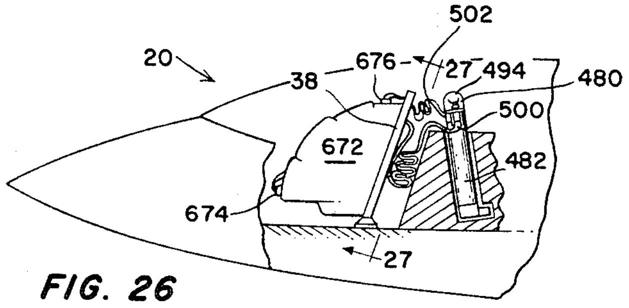
FIGURE 26 is a fragmentary side elevation of an aircraft containing still another embodiment of this invention wherein a portion of the aircraft fuselage is broken away to show interior details.
Figure 27:
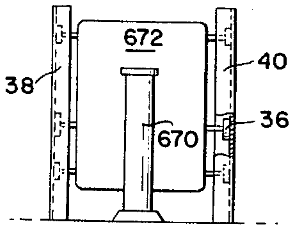
FIGURE 27 is a section taken substantially along lines 27—27 of FIGURE 26.

FIGURES 26 and 27 illustrate a modified embodiment wherein a separate catapult 670 is employed to drive a cockpit capsule 672 upwardly along rails 38 and 40 to a point of separation from the aircraft. Catapult 670 may be of any suitable, conventional form and is mounted at the rear of capsule 672 between guide rails 38 and 40 as shown in FIGURE 27. In this embodiment, tube 482 containing rocket 480 is mounted on the aircraft adjacent to capsule 672. Towlines 500 and 502 are connected to suitable fittings 674 and 676 on capsule 672.

Figure 28:
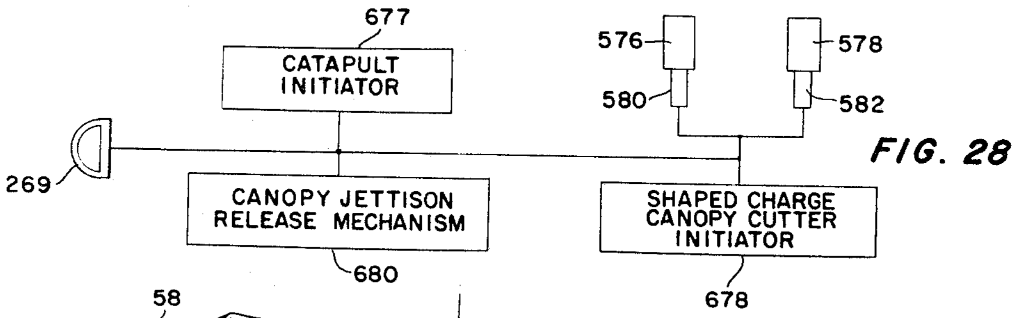
FIGURE 28 is a schematic view of the selectively actuatable control system for the escape apparatus shown in FIGURES 26 and 27.
Figure 29:
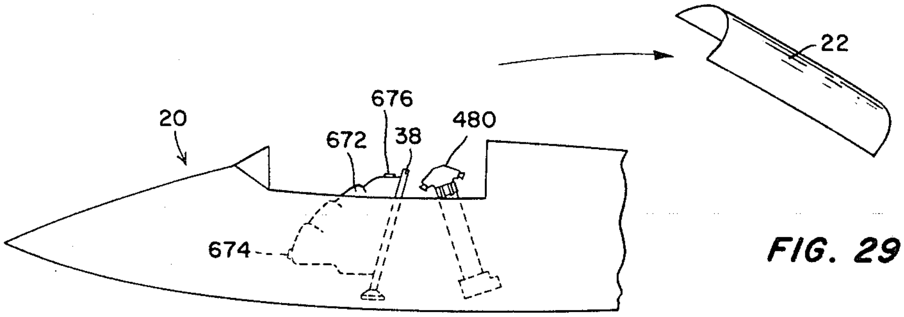
FIGURES 29–31 illustrate the preferred sequence of steps in making an escape with the apparatus shown in FIGURES 27 and 28.

D-ring 269, as shown in FIGURE 28, is connected to an initiator 677 for catapult 670, to an initiator 678 for a shaped charge canopy cutter, to a conventional canopy jettison release mechanism 680, and to firing mechanisms 580 and 582 for cartridge assemblies 576 and 578. In this embodiment, ignition of cartridge assemblies 576 and 578 only serves to launch rocket 480 from tube 482 and does not catapult capsule 672 upwardly along guide rails 38 and 40. When D-ring 269 is pulled, initiator 678 is first actuated to detonate unshown linear-shaped charges for cutting canopy 22 free from the aircraft. The canopy jettison release mechanism 680 then actuates to jettison canopy 22 as shown in FIGURE 29.

Figure 30:
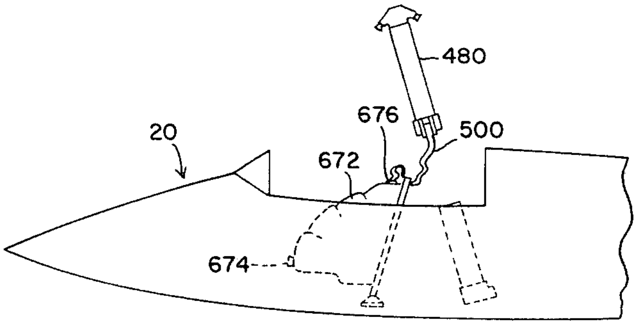
Figure 31:
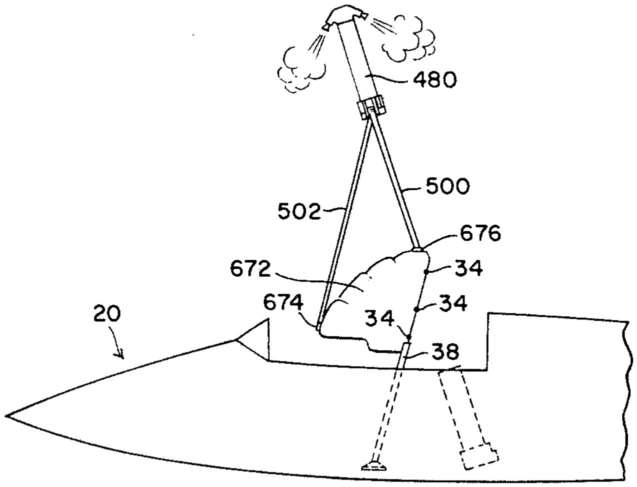

After canopy 22 is jettisoned, cartridge assemblies 576 and 578, which are of the delayed ignition type, ignite to generate gases for launching rocket 480 (see FIGURE 30) in the manner explained in the previous embodiment. Immediately after cartridge assemblies 576 and 578 ignite to launch rocket 480, catapult 470 is fired to quickly drive capsule 672 upwardly to a point of separation from the aircraft as shown in FIGURE 31. The launching of rocket 480 and the firing of catapult 470 are so correlated by suitable timing means in the catapult initiator 477 that rocket 480 is at the end of its tether and firing when catapult 670 has completed its stroke. With towlines 500 and 502 tensioned and the rocket propellent ignited, rocket 480 pulls capsule 672 upwardly to a safe recovery height, giving an inherently stable trajectory over the total speed range of the aircraft.

The invention may be embodied in other specific forms without departing from the spirit or essential characteristices thereof. The present embodiments are therefore to be considered in all respects as illustrative and not restrictive.

What is claimed and desired to be secured by Letters Patent is:

1. An escape apparatus for removing a seated occupant from a vehicle comprising means for catapulting the occupant's seat structure to a point at least approaching separation from said vehicle, a rocket mounted in said vehicle, a towline secured to said rocket, means securing said occupant to said towline remotely from the attachment of said towline to said rocket, and means for launching and igniting said rocket for flight away from said vehicle at a time correlated with the catapulted movement of said seat structure to apply an extraction force through said towline to pull the occupant away from said vehicle in overlapping relation with the catapulted movement of said seat structure for completing the removal of said occupant to a region spaced from said vehicle.

2. The escape apparatus defined in claim 1 wherein said rocket is ignited by said igniting means approximately when said seat structure reaches said point of separation from said vehicle.

3. The escape apparatus defined in claim 1 comprising means mounting said rocket remotely from said seat structure.

4. The escape apparatus defined in claim 1 comprising means supporting said rocket on said seat structure.

5. The escape apparatus defined in claim 1 wherein said means for launching said rocket comprises means actuated by catapulted movement of said seat structure towards the point of separation from said vehicle.

5. The escape apparatus defined in claim 1 wherein said rocket launching and igniting means provides for the launching of said rocket in unignited condition and for the ignition of the rocket fuel only a predetermined time after said rocket is launched.

7. An escape apparatus for removing a seated occupant from an air or space vehicle comprising seat means adapted to receive the occupant, said seat means being mounted in said vehicle for displacement along the occupant's escape path from the vehicle, means for successively applying an ejection force and an extraction force both acting in the same direction to effect the removal of said occupant, said ejection force being applied to said seat means to catapult said seat means with the occupant therein at least to a point approaching separation from said vehicle, and means cooperating with said ejection and extraction force applying means for correlating the application of said extraction force to apply it at least to said occupant in overlapping relation to his catapulted movement to complete the removal of said occupant to a region spaced sufficiently far from said vehicle as to allow the occupant to make a safe recovery by parachute.

8. The escape apparatus defined in claim 7 comprising means correlating the application of said extraction force with the catapulted movement of the occupant and his seat means to apply said extraction force approximately when said seat means reaches the point of separation from said vehicle.

9. A catapult-assisted rocket launching apparatus comprising dual assemblies supporting said rocket on opposite sides thereof and each comprising means for launching said rocket and catapult means receiving said launching means and being operable to catapult said launching means and said rocket as a unitary body, and means for actuating said launching means to launch said rocket for movement relative to said launching means during the catapulted movement of the assembly of said launching means and said rocket.

10. The escape apparatus defined in claim 1 comprising a common fluid pressure source for catapulting said seat structure and launching said rocket.

11. The escape apparatus defined in claim 1 wherein said rocket is mounted on said seat structure to be catapulted therewith.

12. The escape apparatus defined in claim 1 wherein said catapulting means comprises at least one catapult tube fixed to said vehicle and receiving said means for launching said rocket.

13. An escape apparatus for removing an occupant from an air or space vehicle having a seat means in which said occupant is adapted to be strapped, said apparatus comprising selectively actuatable catapult means for ejecting said seat means to a point of separation from said vehicle, a tractor rocket, means including a towline securing said rocket to said occupant, and means correlated with the ejection of said seat means for launching said rocket in unignited condition and thereafter igniting said rocket for flight away from said vehicle to at least pull said occupant through the connection provided by said towline after said seat means has been catapulted through a predetermined distance, said rocket having sufficient fuel to remove said occupant to a region spaced sufficiently far from said vehicle as to allow the occupant to make a safe descent by parachute.

14. The escape apparatus defined in claim 13 wherein said towline is connected directly to harness means worn by said occupant and wherein belt means are provided for strapping said occupant to said seat means.

15. The escape apparatus defined in claim 14 comprising means responsive to the launching of said rocket for releasing said occupant from said seat means.

16. The escape apparatus defined in claim 13 wherein said tow line is connected directly to said seat means.

17. The escape apparatus defined in claim 13 wherein said seat means comprises an encapsulated seat and wherein said towline is secured directly to said encapsulated seat.

18. The escape apparatus defined in claim 13 wherein said rocket is mounted on said vehicle independently of said seat means.

19. The escape apparatus defined in claim 18 comprising a launching tube permanently fixed to said vehicle and receiving said rocket.

20. The escape apparatus defined in claim 13 wherein said rocket is mounted in said seat means for ejection therewith.

21. The escape apparatus defined in claim 20 wherein said catapult means comprises at least one catapult tube fixed to said vehicle, a catapult member received in said tube and operatively connected to said seat means, selectively actuatable means providing a source of fluid pressure for ejecting said member from said tube to catapult said seat means to said point of separation from said vehicle, said catapult member comprising a launching tube receiving the means for launching said rocket.

22. The escape apparatus defined in claim 21 wherein said rocket launching means comprises pressure ejectable piston means received in said launching tube and supporting said rocket and means releasably locking said piston means to said seat means, and means for actuating said locking means to release said piston means from said seat means upon predetermined catapulted movement of said seat means.

23. The escape apparatus defined in claim 21 wherein said rocket launching means comprises piston means received in said launching tube and being operatively connected to said rocket, and means of storing gas pressure from said source for ejecting said piston means to launch said rocket in response to predetermined displacement of said launching tube relative to said catapult tube.

24. The escape apparatus defined in claim 23 comprising means for preventing escape of the catapulting pressure fluid and rocket launching pressure fluid respectively from said catapult tube and said launching tube.

25. A catapult-assisted launching apparatus for a rocket comprising a catapult tube, rocket launching means received in said catapult tube, means for supplying pressurized fluid to said catapult tube for ejecting said launching means from said catapult tube, means operatively connecting said rocket to said launching means for displacement therewith by the pressurized fluid supplied to said catapult tube, and means for actuating said launching means to launch said rocket for movement relative to said launching means during the catapulted movement of the assembly of said launching means and said rocket.

26. A catapult-assisted launching apparatus for a rocket comprising a catapult tube, a launching tube slidably received in said catapult tube, piston means slidably received in said launching tube and being operatively connected to said rocket, and means (a) for supplying fluid pressure to said catapult tube for unitarily catapulting said launching tube, said piston means and said rocket and (b) for supplying fluid pressure to eject said piston means for said launching tube to launch said rocket in response to predetermined movement of said launching tube relative to said catapult tube.

27. The catapult-assisted launching apparatus defined in claim 26 comprising a first expansible fluid pressure chamber defined by said catapult tube for receiving pressurized fluid to eject said launching tube, a second expansible fluid pressure chamber defined by said launching tube for receiving pressurized fluid to eject said piston means, said supply means having a fluid pressure source connected to supply pressurized fluid to said first chamber, passage means connecting said first chamber to said second chamber for enabling fluid in said first chamber to flow into said chamber, valve means operable in response to displacement of said launching tube relative to said catapult tube for blocking fluid flow through said passage means to confine fluid in said second chamber, locking means preventing displacement of said piston means relative to said launching tube, and means operable upon predetermined catapulted displacement of said launching tube relative to said catapult tube for actuating said locking means to release said piston means for ejection from said launching tube under the influence of fluid pressure confined in said second chamber.

28. The catapult-assisted launching apparatus defined in claim 26 comprising a first expansible fluid chamber defined in said catapult tube for receiving pressurized fluid to eject said launching tube, a second expansible fluid chamber defined in said launching tube for receiving pressurized fluid to eject said piston means, a third chamber defined in said piston means, said supply means having a fluid pressure source connected to furnish pressurized fluid to said first chamber, passage means for conveying fluid in said first chamber to said third chamber, and means responsive to predetermined relative displacement between launching tube and said catapult tube for establishing fluid communication between said third and second chambers to convey pressurized fluid to said second chamber for ejecting said piston means.

References Cited

UNITED STATES PATENTS

| | | | |
|---|---|---|---|
| 2,751,171 | 6/1956 | Martin | 244—122 X |
| 2,755,042 | 7/1956 | Paddon | 244—122 |
| 2,900,150 | 8/1959 | Hirt et al. | 244—122 |
| 2,957,664 | 10/1960 | Stencel | 244—147 |
| 2,969,212 | 1/1961 | Martin | 244—141 X |
| 3,010,685 | 11/1961 | Stencel | 244—147 |
| 3,125,851 | 3/1964 | Rubinstein et al. | 89—1.818 X |

MILTON BUCHLER, *Primary Examiner.*

RICHARD A. DORNON, *Assistant Examiner.*

U.S. Cl. X.R.

89—1.818; 244—141

U.S. DEPARTMENT OF COMMERCE

PATENT OFFICE

Washington, D.C. 20231

UNITED STATES PATENT OFFICE

CERTIFICATE OF CORRECTION

Patent No. 3,442,473 May 6, 1969

John C. Rivedal et al.

It is certified that error appears in the above identified patent and that said Letters Patent are hereby corrected as shown below:

Column 2, line 25, "lanuching" should read -- launching --. Column 3, line 57, "sea" should read -- seat --. Column 5, line 45, "and" should read -- with --; line 54, "144" should read -- 114 --; line 63, "in" should read -- is --. Column 6, line 2, "in" should read -- on --; line 33, "its" should read -- is --. Column 8, line 68, "140" should read -- 240 --. Column 9, line 26, after "250" insert -- is --. Column 10, line 45 should read -- ly rejected out of launching tube 158a in the same man- --. Column 12, line 48, "development" should read -- deployment --. Column 17, line 51, "544" should read -- 524 --. Column 21, line 30, "5." should read -- 6. --; line 66, "said", first occurrence, should read -- the --.

Signed and sealed this 14th day of April 1970.

(SEAL)

Attest:

Edward M. Fletcher, Jr.

Attesting Officer

WILLIAM E. SCHUYLER, JR.

Commissioner of Patents